(12) United States Patent
Okano et al.

(10) Patent No.: US 11,656,535 B2
(45) Date of Patent: May 23, 2023

(54) SHOE DEVICE AND ACCESSORY HAVING SHOE DEVICE

(71) Applicant: CANON KABUSHIKI KAISHA, Tokyo (JP)

(72) Inventors: Yoshinobu Okano, Saitama (JP); Kenji Ishii, Kanagawa (JP); Keita Hirayama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/486,035

(22) Filed: Sep. 27, 2021

(65) Prior Publication Data
US 2022/0100055 A1    Mar. 31, 2022

(30) Foreign Application Priority Data
Sep. 29, 2020 (JP) .............................. JP2020-163799

(51) Int. Cl.
*G03B 15/05* (2021.01)
(52) U.S. Cl.
CPC .................................... *G03B 15/05* (2013.01)
(58) Field of Classification Search
CPC ..................................................... G03B 15/05
See application file for complete search history.

(56) References Cited

U.S. PATENT DOCUMENTS

| 5,089,834 | A | * | 2/1992 | Nakasa | ................... | G03B 15/05 |
| | | | | | | 396/176 |
| 2017/0219917 | A1 | * | 8/2017 | Seo | ..................... | H01R 13/2442 |

FOREIGN PATENT DOCUMENTS

JP       2018-084681 A     5/2018

* cited by examiner

*Primary Examiner* — Minh Q Phan
(74) *Attorney, Agent, or Firm* — Cowan, Liebowitz & Latman, P.C.

(57) ABSTRACT

A shoe device of an accessory that secures necessary functions and mechanical strength when the accessory is used with attaching to an electronic apparatus and that improves convenience during use when the accessory is used without attaching to an electronic apparatus. An engagement member is attachable to and detachable from an accessory shoe device of an electronic apparatus by sliding in a first direction. A holding member holds the engagement member. An attachment part is provided in the engagement member or the holding member and allows attachment of a member different from the accessory shoe device. A connection member has connection terminals arranged in a second direction that intersects perpendicularly with the first direction and is arranged in a front of the holding member in the first direction. The attachment part is provided behind the connection terminals in the first direction.

15 Claims, 23 Drawing Sheets

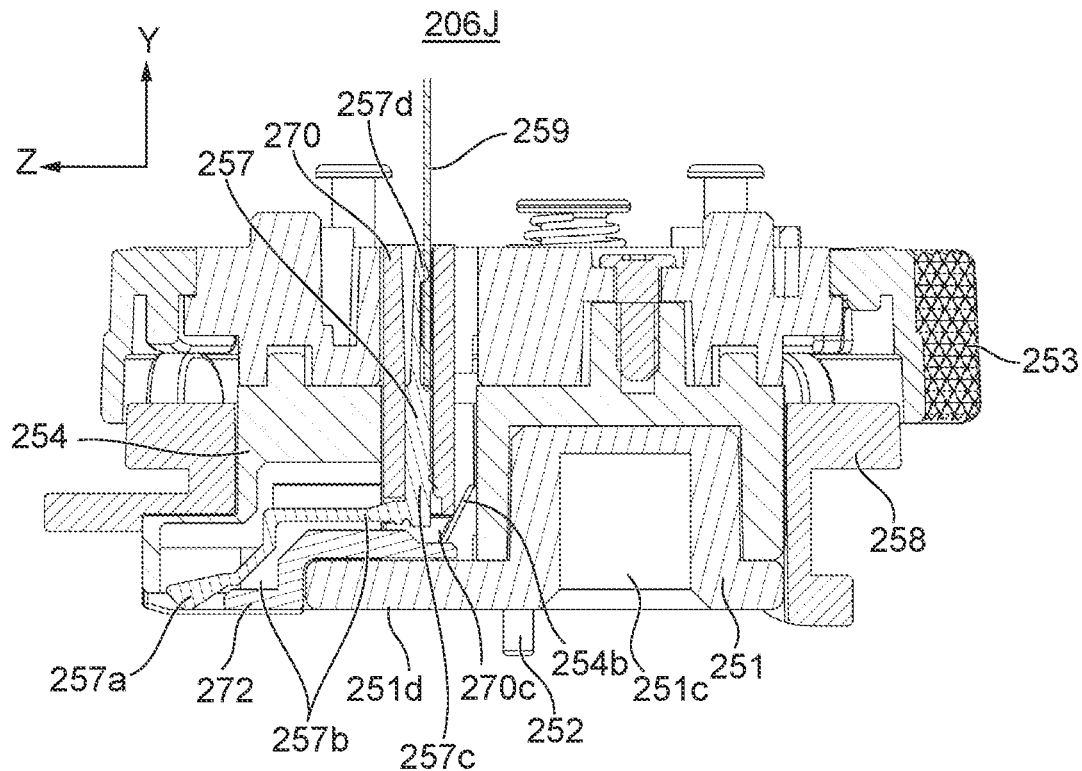
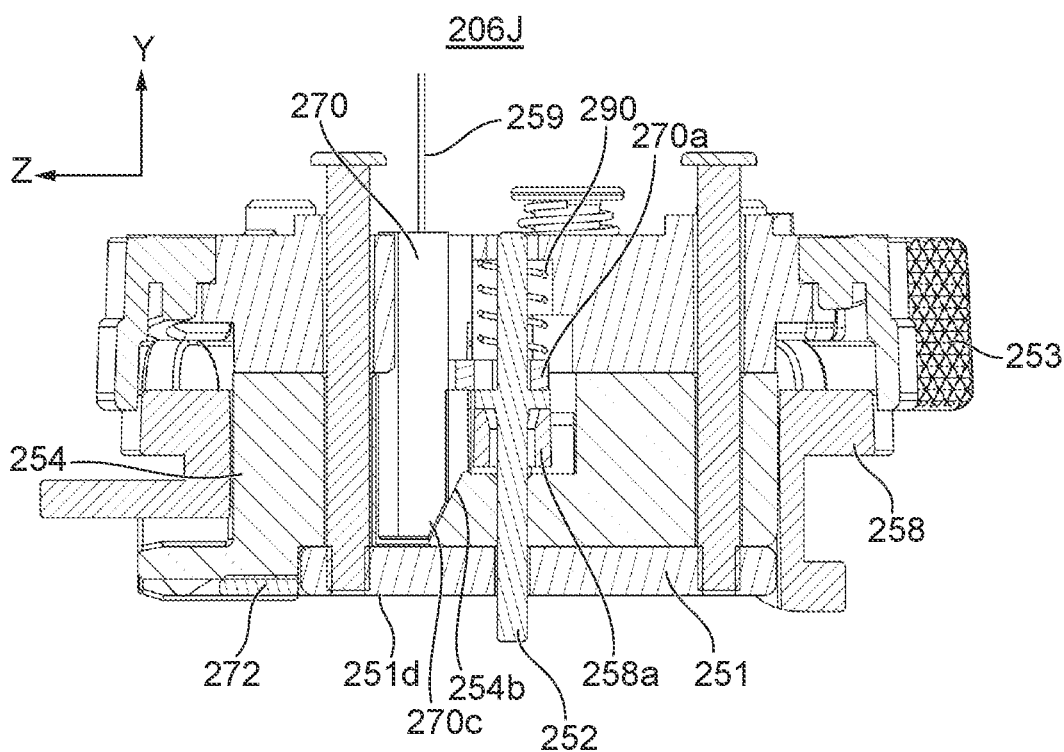

SHOE DEVICE AND ACCESSORY HAVING SHOE DEVICE

BACKGROUND OF THE INVENTION

Field of the Invention

The present invention relates to a shoe device that is provided in an accessory so that the accessory can be attached to and detached from an electronic apparatus and relates to the accessories equipped with the shoe device.

Description of the Related Art

There is a known image pickup apparatus, such as a digital camera, as an example of an electronic apparatus that is provided with an accessory shoe device to attach an accessory for image pickup, such as a lighting device (an electronic flash device). Generally, an accessory shoe device has an engagement part that enables attachment and detachment of a shoe device of an accessory. Moreover, an accessory shoe device and a shoe device respectively have connection terminals that enable two-way communications therebetween.

A conventional image pickup apparatus communicates with an accessory through five connection terminals provided in each of the accessory shoe device and the shoe device, for example. However, since variety of accessory shoe devices is diversified and functions of accessories increase in recent years, the conventional five connection terminals become short. Accordingly, Japanese Laid-Open Patent Publication (Kokai) No. 2018-084681 (JP 2018-084681A) discloses an image pickup apparatus having an accessory shoe device that increases the number of connection terminals and an electronic view finder having a shoe device that has connection terminals corresponding to the accessory shoe device. The accessory shoe device and shoe device disclosed in the above-mentioned publication increase the number of connection terminals without changing shapes of engagement parts.

An accessory equipped with a shoe device may be installed in a position away from an image pickup apparatus without being attached to the image pickup apparatus so as to operate in cooperation with the image pickup apparatus. For example, there is a known image pickup method that installs an electronic flash device in a position away from an image pickup apparatus and illuminates an object in synchronization with an image pickup operation of the image pickup apparatus by a wireless communication. In this case, a camera tripod, a stand, or the like to which the shoe device is attachable is used to install the electronic flash device in a predetermined position, for example.

However, the shoe device disclosed in the above-mentioned publication does not have a structure (specifically, a tripod internal thread) that enables direct attachment to a general camera tripod etc. that are used to fix an image pickup apparatus. This is because the shoe device having many connection terminals gives priority to reservation of an area for arranging the many communication terminals and to reservation of an area required to arrange parts needed to strong connection to the accessory shoe device. Accordingly, it is necessary to prepare a tripod or a stand for exclusive use separately, and user-unfriendly.

SUMMARY OF THE INVENTION

The present invention provides a shoe device that secures necessary functions and mechanical strength in a case where an accessory is used with attaching to an electronic apparatus and that improves convenience during use in a case where the accessory is used without attaching to an electronic apparatus.

Accordingly, an aspect of the present invention provides a shoe device that is attachable to and detachable from an accessory shoe device of an electronic apparatus, the shoe device including an engagement member that is attachable to and detachable from the accessory shoe device by sliding in a first direction, a holding member that holds the engagement member, an attachment part that is provided in one of the engagement member and the holding member and allows attachment of a member different from the accessory shoe device, and a connection member that has connection terminals arranged in a second direction that intersects perpendicularly with the first direction and is arranged in a front of the holding member in the first direction, wherein the attachment part is provided behind the connection terminals in the first direction.

According to the present invention, the shoe device that secures necessary functions and mechanical strength in a case where an accessory is used with attaching to an electronic apparatus and that improves convenience during use in a case where the accessory is used without attaching to an electronic apparatus can be provided.

Further features of the present invention will become apparent from the following description of exemplary embodiments with reference to the attached drawings.

BRIEF DESCRIPTION OF THE DRAWINGS

FIG. 24A and FIG. 24B are sectional views respectively showing the camera connector shown in FIG. 22 in the locked state taken along lines corresponding to the lines J1-J1 and J2-J2 in FIG. 17.

DESCRIPTION OF THE EMBODIMENTS

Figure 1:
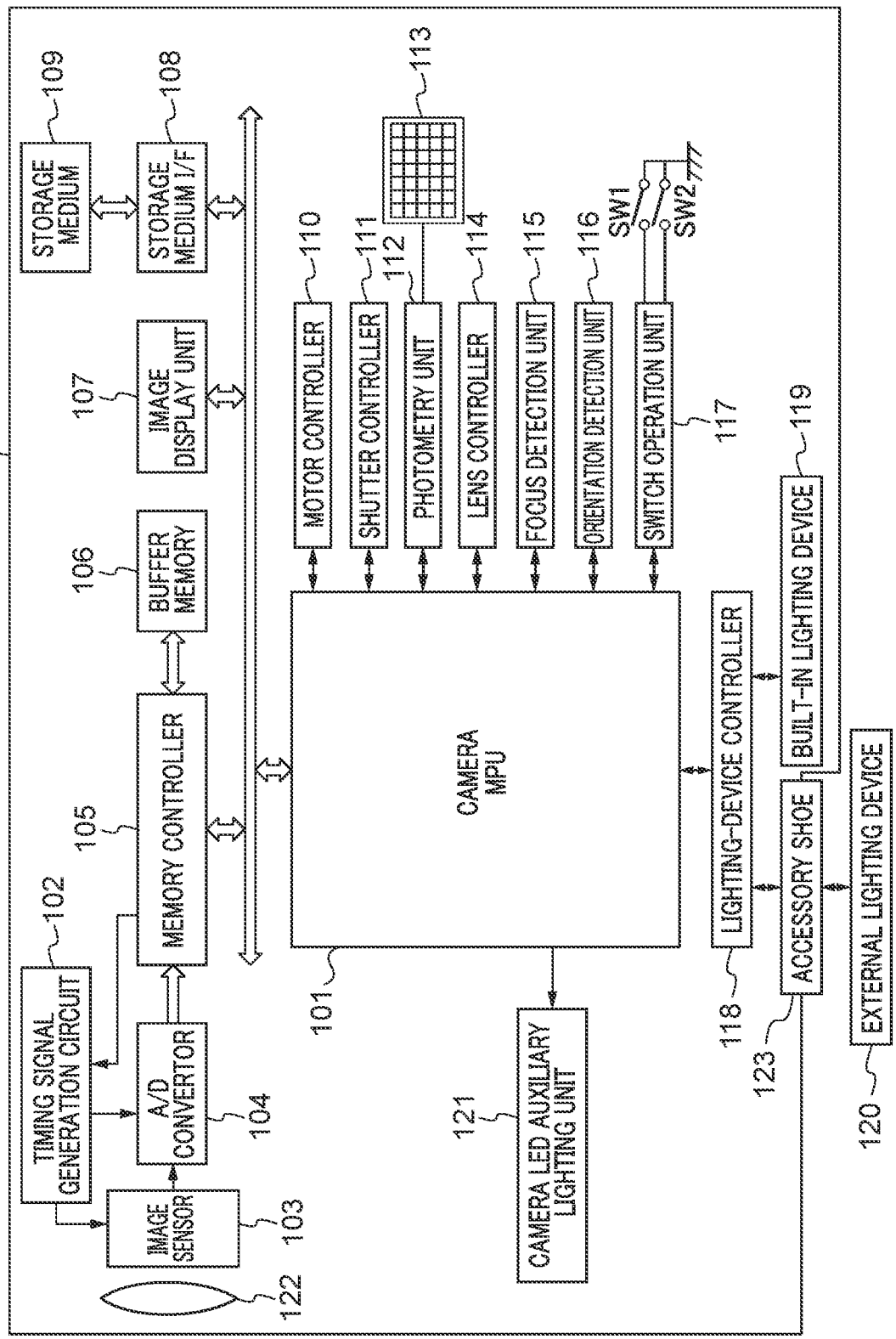
FIG. 1 is a block diagram schematically showing a configuration of a digital camera according to an embodiment.

Hereafter, embodiments according to the present invention will be described in detail by referring to the drawings. In the following embodiments, a digital camera (an image pickup apparatuses) is taken up as an electronic apparatus equipped with an accessory shoe device. Moreover, an external lighting device (what is called an electronic flash device) is taken up as an accessory equipped with a shoe device that is constituted so as to be attachable to and detachable from the accessory shoe device of the digital camera. The digital camera and electronic flash device constitute an image pickup system. It should be noted that an accessory equipped with a shoe device is not limited to an electronic flash device. An accessory may be an electronic view finder, a microphone for moving image pickup, etc. as another example. Moreover, an electronic apparatus equipped with the accessory shoe device constituted so as to engage with the shoe device is not limited to an image pickup apparatus.

FIG. 1 is a block diagram schematically showing a configuration of a digital camera 100. The digital camera 100 is provided with a camera microcontroller 101 (hereinafter referred to as a "camera MPU 101"), an image pickup optical system 122, a timing signal generating circuit 102, an image sensor 103, an A/D converter 104, a memory controller 105, and a buffer memory 106. Moreover, the digital camera 100 is provided with an image display unit 107, a storage medium I/F 108, a motor controller 110, a shutter controller 111, a photometry unit 112, a multi-division photometry sensor 113, a lens controller 114, a focus detection unit 115, an orientation detection unit 116, and a switch operation unit 117. Furthermore, the digital camera 100 is provided with a lighting-device controller 118, a built-in lighting device 119, a camera LED auxiliary lighting unit 121, and the accessory shoe device 123 (hereinafter referred to as an "accessory shoe 123"). The digital camera 100 allows insertion and extraction of a storage medium 109 and allows attachment and detachment of the external lighting device 120.

The camera MPU 101 controls actions of the entire image pickup system including an image pickup sequence. Moreover, the camera MPU 101 applies predetermined image processes to an image signal mentioned later to generate image data. The image pickup optical system 122 includes a plurality of lens groups, such as a zoom lens and a focusing lens, a diaphragm, and a shutter, and forms an optical image on the image sensor 103 by refracting reflected light from an object. The image sensor 103 is a CCD image sensor, a CMOS image sensor, or the like that converts the optical image formed by the reflected light from the object into an analog electric signal. The timing signal generating circuit 102 generates a timing signal required to drive the image sensor 103.

The A/D converter 104 converts the analog electric signal read from the image sensor 103 into a digital electric signal to generate an image signal. The memory controller 105 controls reading and writing of a memory (not shown) and controls a refreshment operation of the buffer memory 106. The buffer memory 106 temporarily stores the image signal output from the A/D converter 104 and image data displayed on the image display unit 107. The image display unit 107 has a display device, such as a liquid crystal panel or an organic EL panel, and displays the image data stored in the buffer memory 106.

The digital camera 100 is configured to enable insertion and extraction of the storage medium 109 like a memory card. The storage medium I/F 108 enables communication between the camera MPU 101 and the storage medium 109 that is currently mounted in the digital camera 100. The storage medium 109 stores the image data generated by the camera MPU 101. It should be noted that the storage medium 109 may be a storage device like a hard disk drive built in the digital camera 100.

The motor controller 110 drives a mirror (not shown) between a mirror-up position and a mirror-down position and charges the shutter at a time of an exposure operation by controlling motors (not shown) according to signals from the camera MPU 101. The shutter controller 111 controls the exposure operation by cutting electric current to the shutter (a shutter front curtain and a shutter rear curtain) provided in the image pickup optical system 122 according to a signal from the camera MPU 101 so that the shutter front curtain and the shutter rear curtain travel.

The multi-division photometry sensor 113 has a plurality of photometry areas that divide an image-pickup screen. The photometry unit 112 obtains the signals from the multi-division photometry sensor 113 and outputs them to the camera MPU 101 as luminance signals of the respective photometry areas in the image-pickup screen. The camera MPU 101 calculates values for exposure control, such as an AV (aperture value), a TV (shutter speed), ISO (sensitivity of the image sensor 103), on the basis of the luminance signals obtained from the photometry unit 112. Moreover, the photometry unit 112 outputs luminance signals detected when the built-in lighting device 119 or the external lighting device 120 performs pre-emission towards a field to the camera MPU 101. The camera MPU 101 calculates a main emission amount of the external lighting device 120 at a time of exposure (image pickup) on the basis of these luminance signals.

The lens controller 114 communicates with the camera MPU 101 through lens mount contacts and controls focus and aperture of the image pickup optical system 122 by controlling a lens drive motor and diaphragm drive motor (not shown). The focus detection unit 115 detects a defocus amount to an object for automatic focusing control (auto-focusing (AF)) using a well-known phase difference detection method. The orientation detection unit 116 detects a tilt of the digital camera 100 in a rotational direction around an image-pickup optical axis. The switch operation unit 117 detects switchings of a SW1 (first switch) and a SW2 (second switch) and transmits a detection result to the camera MPU 101. The SW1 turns ON when a release button (not shown) is pressed in a first stroke (half press). The camera MPU 101 starts the AF and photometry in response to the ON signal of the SW1. The SW2 turns ON when the release button is pressed in a second stroke (full press). The camera MPU 101 starts an exposure operation in response to the ON signal of the SW2. It should be noted that a signal that occurs in response to an operation of an operating member (not shown) other than the SW1 and SW2 is also detected by the switch operation unit 117 and is transmitted to the camera MPU 101.

The external lighting device 120 is detachably attachable to the accessory shoe 123. According to instructions from the camera MPU 101, the lighting device controller 118 controls emission operations (preliminary emission, main emission, and auxiliary light emission, etc.) of the built-in lighting device 119 and controls the emission operations of the external lighting device 120 through the accessory shoe 123. Moreover, when detecting attachment of the external lighting device 120 to the accessory shoe 123, the lighting device controller 118 starts to supply electric current to the external lighting device 120 through the accessory shoe 123. The configuration of the accessory shoe 123 will be mentioned below in detail.

The camera LED auxiliary light unit 121 irradiates an object with near-infrared light (LED auxiliary light) to project a predetermined pattern used as auxiliary light of the focus detection control by the focus detection unit 115. The camera MPU 101 functions as an auxiliary light controller that controls irradiation of the auxiliary light toward an object for the focus detection by the built-in lighting device 119 or the external lighting device 120 on the basis of the luminance signal output from the photometry unit 112. Specifically, the camera MPU 101 instructs emission of flash auxiliary light to the built-in lighting device 119 or the external lighting device 120 through the lighting device controller 118. Alternatively, the camera MPU 101 instructs emission of the LED auxiliary light to the camera LED auxiliary light unit 121 or instructs emission of the LED auxiliary light to an LED auxiliary lighting unit 207 (see FIG. 2) of the external lighting device 120 through the lighting device controller 118.

Figure 2:
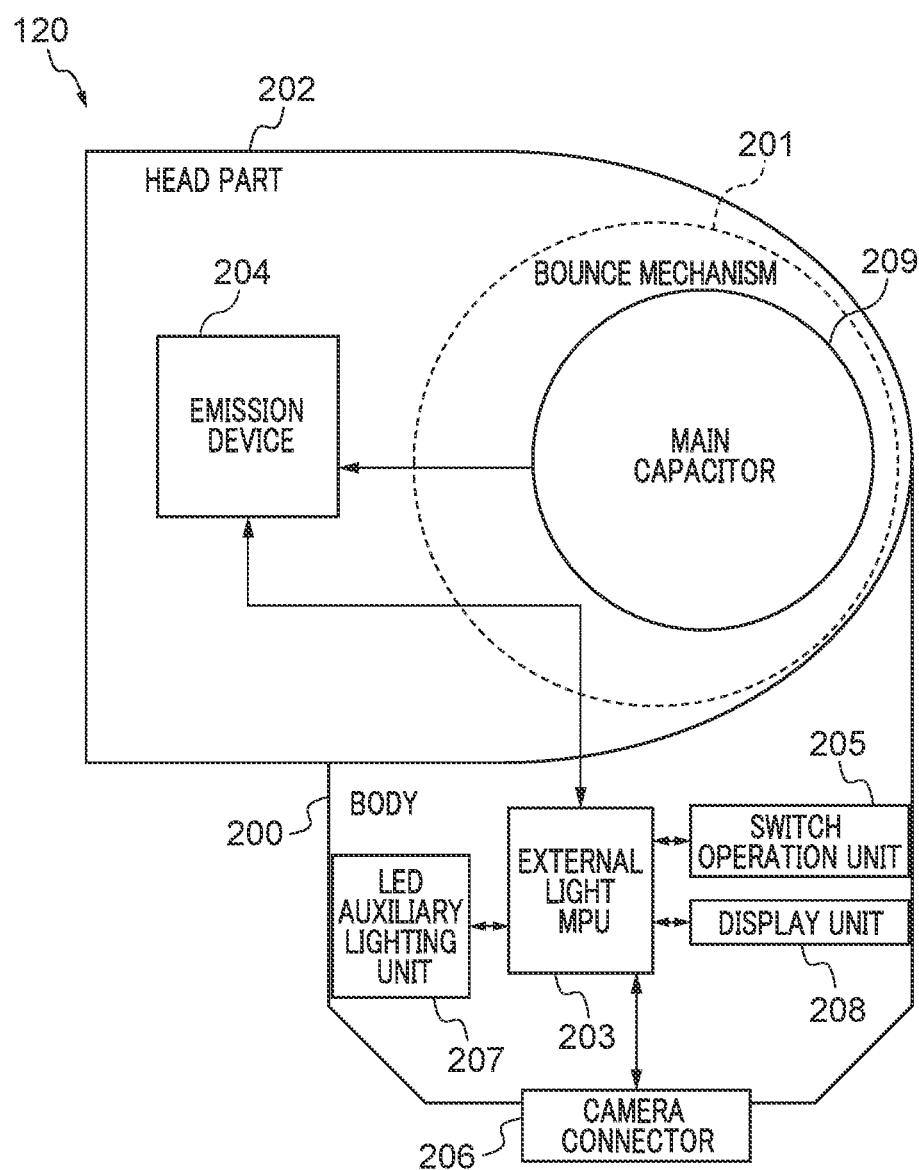
FIG. 2 is a block diagram schematically showing an external lighting device that is attachable to and detachable from the digital camera in FIG. 1.

FIG. 2 is a block diagram schematically showing a configuration of the external lighting device 120. The external lighting device 120 mainly consists of a body 200, a bounce mechanism 201, and a head part 202. The body 200 has an external light MPU 203, a switch operation unit 205 connected to various operation members like a power switch, a display unit 208, the LED auxiliary lighting unit 207, and a camera connector 206.

The external light MPU 203 is implemented in a main substrate (not shown) and functions as a microcontroller that controls all actions of the external lighting device 120 including an emission control sequence of the external lighting device 120. The camera connector 206 is a shoe device that mechanically and electrically connects the external lighting device 120 to the accessory shoe 123 of the digital camera 100. The camera MPU 101 communicates with the external light MPU 203 through the lighting device controller 118, the accessory shoe 123, and the camera connector 206. Details of the configuration of the camera connector 206 will be mentioned later.

The LED auxiliary lighting unit 207 irradiates an object with near-infrared light (LED auxiliary light) to project a predetermined pattern used as auxiliary light of the focus detection control by the camera MPU 101 through the focus detection unit 115 as with the camera LED auxiliary light unit 121. The bounce mechanism 201 has a well-known mechanism that enables rotation of the head part 202 with respect to the body 200 and includes a main capacitor 209. The bounce mechanism 201 is used to direct the flash light in a direction that is not directed to an object, for example, and holds the head part 202 so as to be rotatable in the horizontal direction and the vertical direction with respect to the body 200. Use of the bounce mechanism 201 allows what is called bounce photography by lighting an object indirectly. The head part 202 has an emission device 204 that emits flash light. The emission device 204 includes a discharge tube like a xenon tube or an LED that emits flash light. The emission device 204 includes a reflection umbrella, a Fresnel lens, and a flash circuit that controls emission of flash light according to an emission signal from the external light MPU 203. These included elements are not shown in FIG. 2.

Figure 3A:
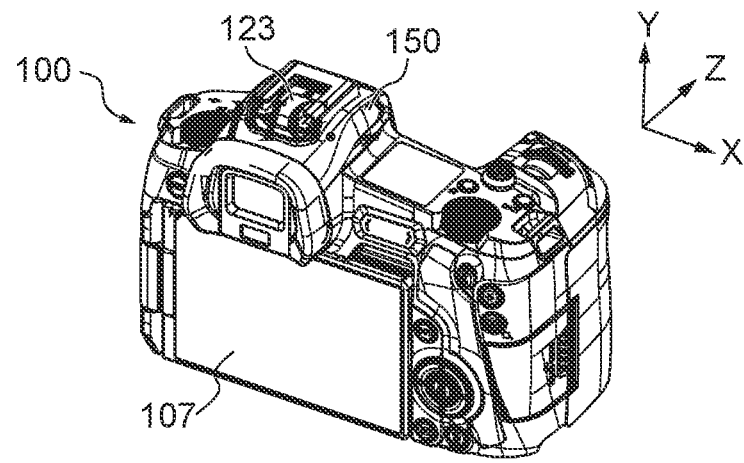
FIG. 3A is a perspective view showing the digital camera viewed from a rear side.
Figure 3B:
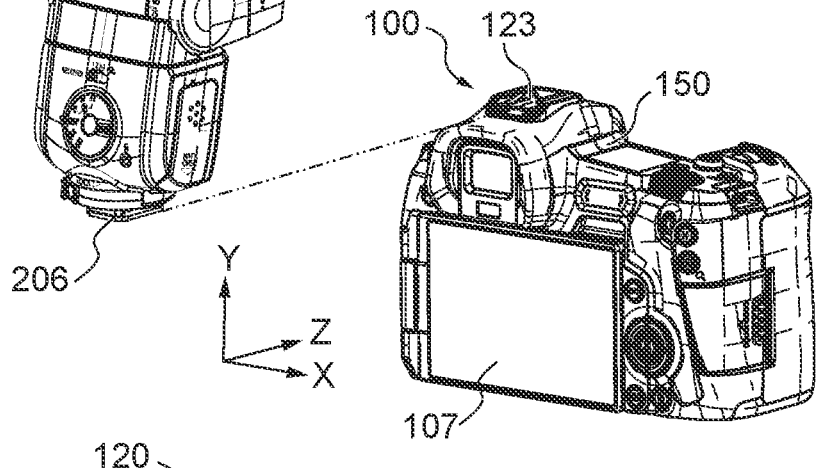
FIG. 3B is a perspective view showing a method for attaching the external lighting device in FIG. 2 to an accessory shoe of the digital camera.
Figure 3C:
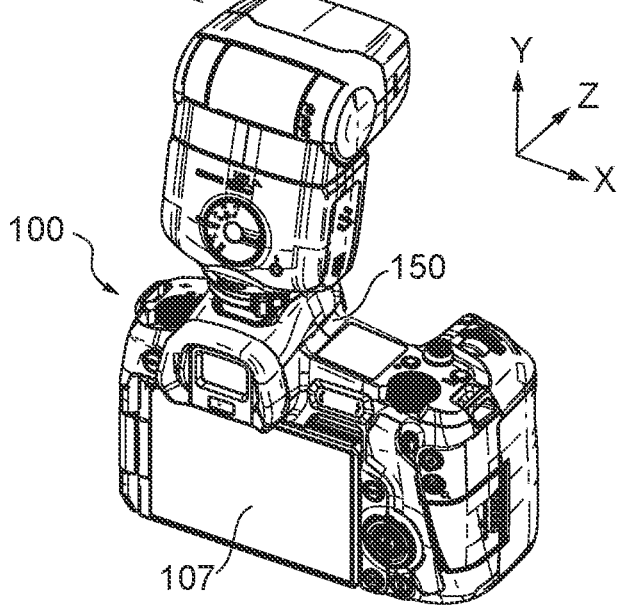
FIG. 3C is a perspective view showing a state where the external lighting device is attached to the digital camera viewed from the rear side.

FIG. 3A is a perspective view showing the digital camera 100 viewed from the rear side. FIG. 3B is a perspective view showing a method for attaching the camera connector 206 of the external lighting device 120 to the accessory shoe 123 of the digital camera 100. FIG. 3C is a perspective view showing a state where the external lighting device 120 is attached to the digital camera 100 viewed from the rear side.

As shown in FIG. 3A, FIG. 3B, and FIG. 3C, an orthogonal coordinate system that consists of an X-axis, a Y-axis, and a Z-axis is defined to the digital camera 100 and the external lighting device 120. A Z-direction (a first direction) is a front-and-back direction of the digital camera 100, is parallel to an image-pickup optical axis of the digital camera 100 and intersects perpendicularly with the image pickup surface of the image sensor 103. When the Z-direction is parallel to a horizontal direction, an X-direction (a second direction) perpendicularly intersects with the Z-direction in a horizontal plane. The X-direction is a width direction of the digital camera 100. A Y-direction (a third direction) perpendicularly intersects with both the Z-direction and X-direction. The Y-direction is a height direction of the digital camera 100. Moreover, an arrow of each axis shown in FIG. 3A shows a positive direction (+ direction).

The image pickup optical system 122 (not shown in FIG. 3A, FIG. 3B, and FIG. 3C) is provided on the front side (+Z-direction side) of the digital camera 100 and the image display unit 107 is provided on the rear side (−Z-direction side) of the digital camera 100. A top cover 150 as an exterior member is provided in the upper part of the digital camera 100. The accessory shoe 123 is arranged to the top cover 150.

The camera connector 206 is provided in the bottom (−Y-direction side) of the external lighting device 120. A user slides the external lighting device 120 to the digital camera 100 in the direction (+Z direction) from the rear side toward the front side of the digital camera 100 so as to engage the camera connector 206 with the accessory shoe 123. Thereby, the external lighting device 120 is attached to the digital camera 100. When detaching the external lighting device 120 from the digital camera 100, the user should perform an operation reverse to the attachment operation.

Figure 4A:
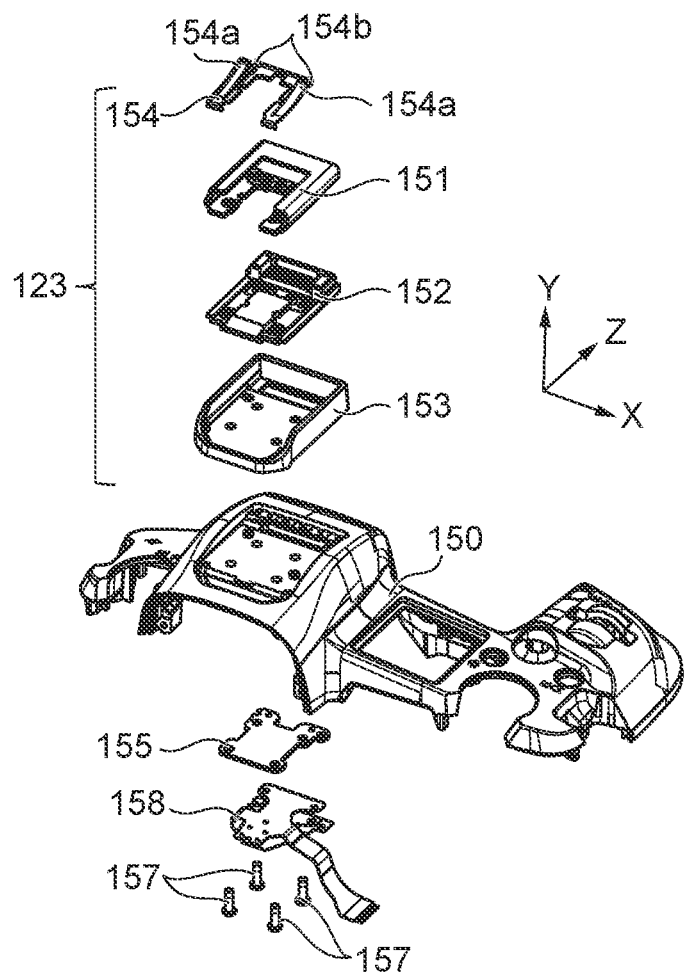
FIG. 4A is an exploded perspective view showing a configuration of an accessory shoe device of the digital camera in FIG. 3A.
Figure 4B:
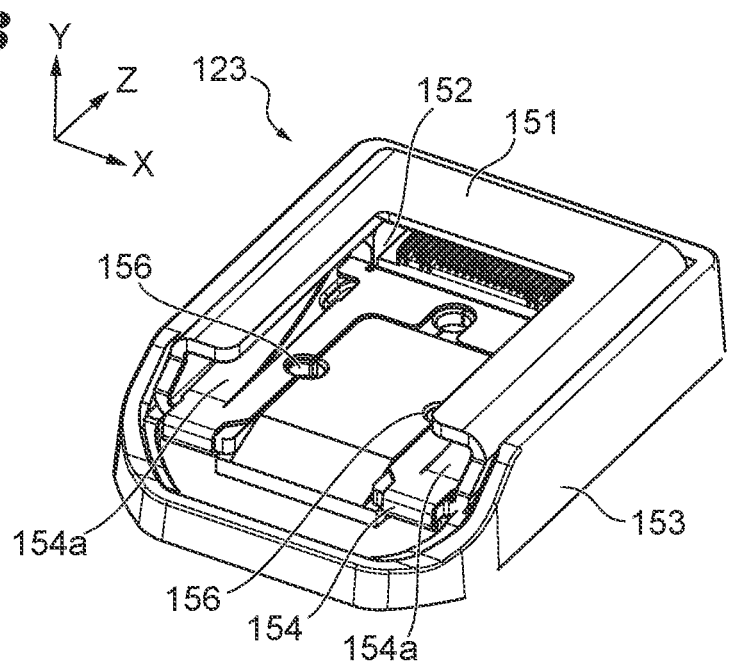
FIG. 4B is a perspective view showing the entire accessory shoe device.

Next, the accessory shoe 123 of the digital camera 100 will be described. FIG. 4A is an exploded perspective view showing the accessory shoe 123. FIG. 4B is an entire perspective view showing the accessory shoe 123. The accessory shoe 123 is assembled to the top cover 150 in the Y-direction. The accessory shoe 123 is arranged on the +Y-direction side of the top cover 150. In the meantime, an accessory shoe holding member 155 and a flexible substrate 158 are arranged on the −Y-direction side of the top cover 150. In this way, the members arranged on the +Y-direction side and −Y-direction side of the top cover 150 are fixed to the top cover 150 with screws 157.

The accessory shoe 123 is provided with an engagement member 151, a signal terminal connector 152, a shoe stage 153, and an accessory shoe spring 154. The engagement member 151 is a member (an engaged member) that engages with the camera connector 206 of the external lighting device 120 and holds it. The signal terminal connector 152 is provided with a plurality of signal terminals 152a (see FIG. 5C) that are juxtaposed at equal pitches in the X-direction in a connector base member formed from synthetic resin material.

Although a signal terminal 152a is a connection terminal for electric connection, the name of "signal terminal" is used for convenience in order to distinguish from below-mentioned connection terminals 257 of the camera connector 206. Moreover, the signal terminal connector 152 is a holding member of the accessory shoe 123 that holds the signal terminals 152a.

Figure 5A:
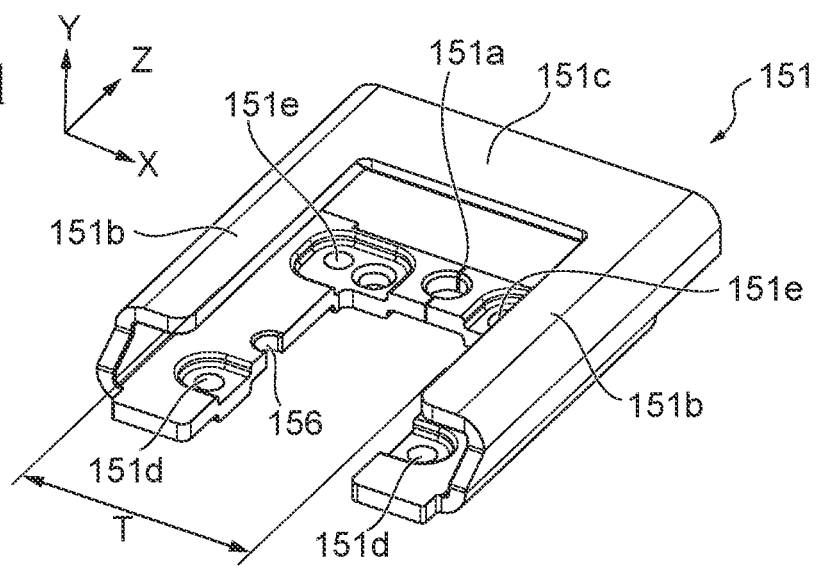
FIG. 5A, FIG. 5B, and FIG. 5C are views showing configurations of an engaged member of the accessory shoe device in FIG. 4A and a signal terminal connector.
Figure 5B:
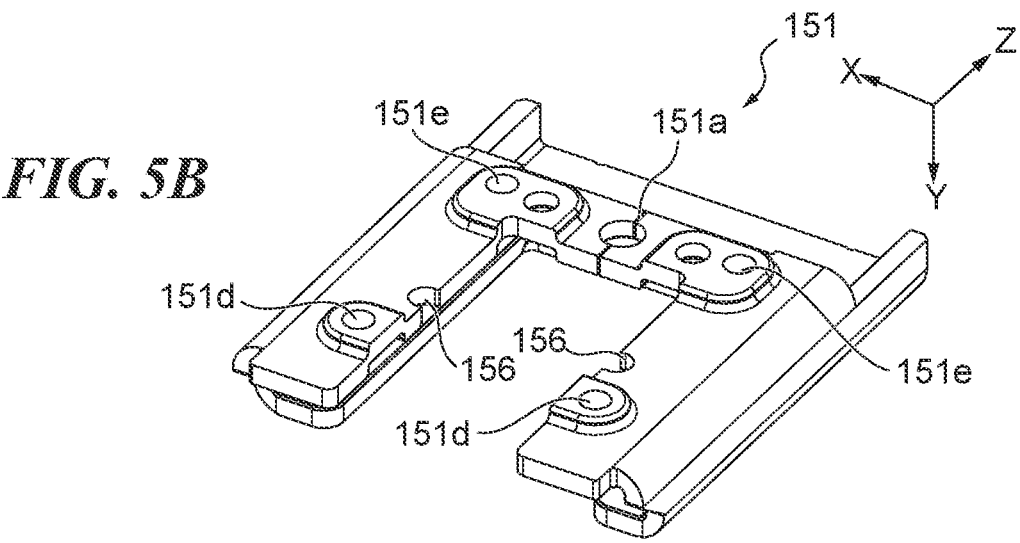
Figure 5C:
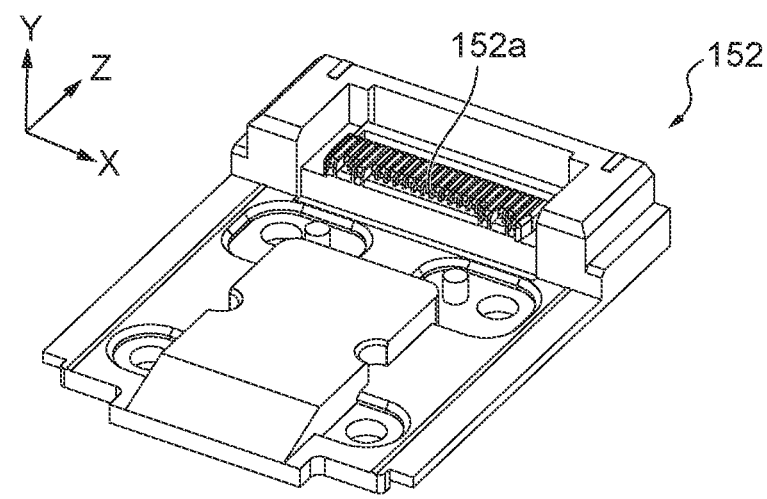

As shown in FIG. 5C, the signal terminals 152a are arranged on the +Z-direction side of the signal terminal connector 152. As shown in FIG. 4B, a plurality of engagement holes 156 with which a plurality of lock pins 252 (see FIG. 6A) of the external lighting device 120 are engaged are provided on the −Z-direction side of the signal terminal connector 152. Specifically, the two lock pins 252 and the two engagement holes 156 are provided.

When the camera connector 206 of the external lighting device 120 is engaged with the accessory shoe 123, the signal terminals 152a are electrically connected with the connection terminals 257 of the external lighting device 120, respectively. The signal terminals 152a are electrically connected with a flexible substrate 158 arranged under the top cover 150 (the −Y-direction side). The flexible substrate 158 is connected to the main substrate (not shown) of the digital camera 100. Accordingly, the attachment of the external lighting device 120 to the accessory shoe 123 enables communications between the external lighting device 120 and the digital camera 100.

The shoe stage 153 is a housing member surrounding the engaged member 151 and signal terminal connector 152. The accessory shoe holding member 155 is a structure skeleton that holds the engaged member 151. The four screws 157 are fastened to the engaged member 151 by inserting through the flexible substrate 158, accessory shoe holding member 155, top cover 150, shoe stage 153, and signal terminal connector 152. Thereby, these members are positioned and fixed. The members are combined with sufficient balance by respectively arranging the four screws 157 to four areas that are equally divided in the X-direction and the Z-direction.

The accessory shoe spring 154 is made from conductive material like metal. The accessory shoe spring 154 has an elastic deformation part 154a that energizes the camera connector 206 that engaged with the engagement member 151 in the Y-direction and an abutting face 154b with which the camera connector 206 abuts in the Z-direction.

FIG. 5A and FIG. 5B are perspective views showing the engagement member 151 viewed from different directions. The engagement member 151 is formed by bending a metal plate into a loop shape so that both end faces of both bended edges are mutually faced and contacted at a joint 151a. Moreover, the engagement member 151 has a pair of engagement parts 151b and a connection part 151c that mutually connects the pair of engagement parts 151b. A pair of first screw holes 151d and a pair of second screw holes 151e, which are used for fastening with the screws 157, and the engagement holes 156, which are engaged with the lock pins 252 of the external lighting device 120, are further formed in the engagement member 151.

The pair of engagement parts 151b are spaced apart at a predetermined width (hereinafter referred to as an "engagement part space T") in the X-direction. A holding member 254 (see FIG. 6A) of the external lighting device 120 is inserted into the engagement part space T. The pair of first screw holes 151d are provided at a predetermined space in the X-direction and are used as fastening holes (first fastening holes) on the −Z-direction side of the engagement member 151. The pair of second screw holes 151d are provided at a predetermined space in the X-direction and are used as fastening holes (second fastening holes) on the +Z-direction side of the engagement member 151. Each of the engagement holes 156 is formed at a position that enables engagement of each of the lock pins 252 of the external lighting device 120 within an area between the first screw hole 151d and the second screw hole 151e.

FIG. 5C is a perspective view showing the signal terminal connector 152. The signal terminals 152a are exposed to the external appearance of the signal terminal connector 152 as shown in FIG. 4B. In the pitch direction (X-direction) along which the signal terminals 152a are aligned, since the position of the camera connector 206 is regulated by the engagement part space T of the engagement member 151, the holding member 254 of the external lighting device 120 is positioned with respect to the signal terminal connector 152 by the engagement member 151.

Figure 6A:
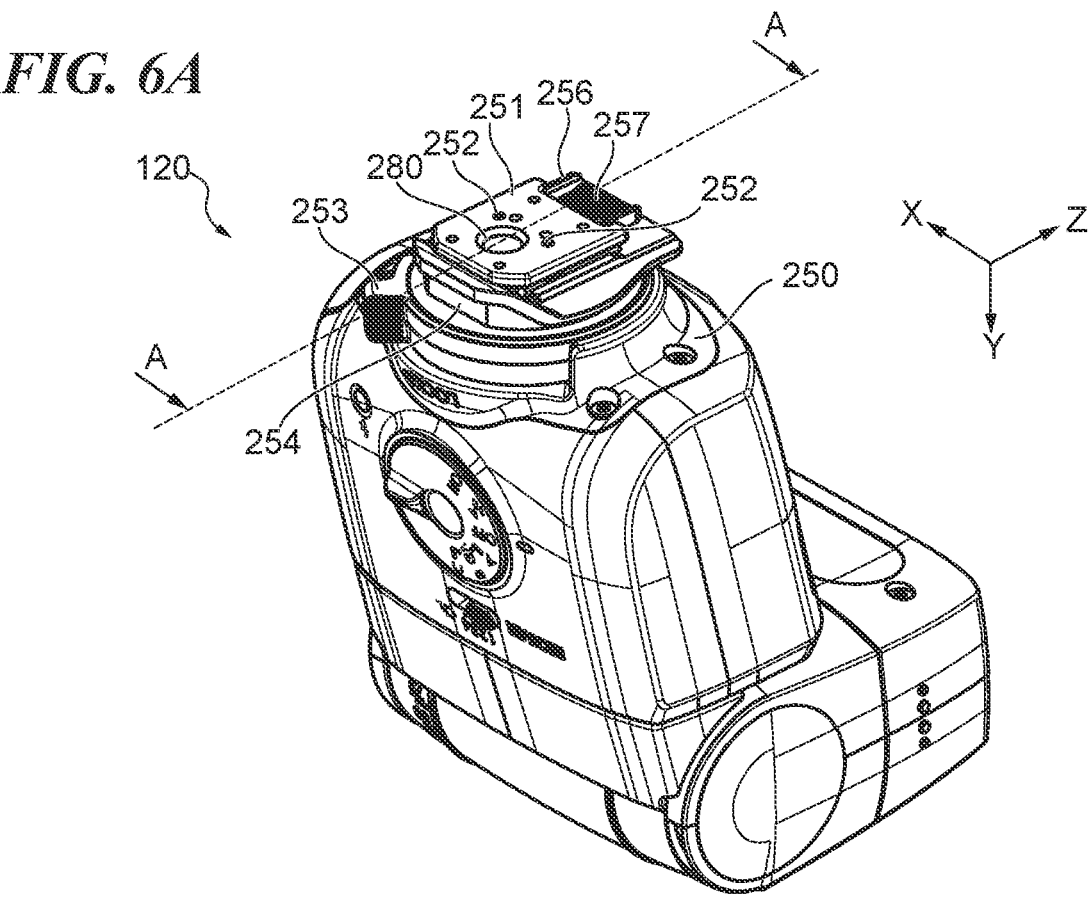
FIG. 6A is a perspective view showing an external lighting device according to a first embodiment.
Figure 6B:
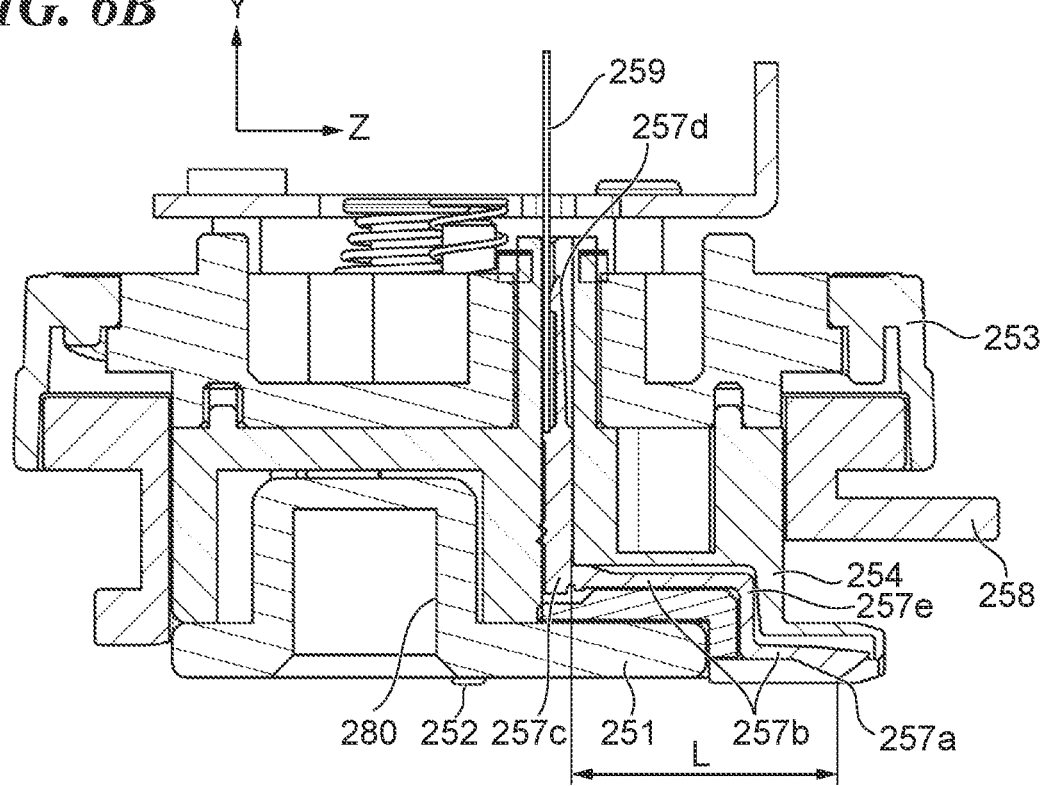
FIG. 6B is a sectional view showing the external lighting device shown in FIG. 6A taken along a line A-A.

Next, the external lighting device 120 according to a first embodiment will be described. FIG. 6A is an external perspective view showing the external lighting device 120 viewed from the −Y-direction side in order to mainly show an appearance structure of the camera connector 206. FIG. 6B is a sectional view (YZ plane) taken along a line A-A shown in FIG. 6A and shows an internal structure of the camera connector 206 in a state (unlocked state) where a lock lever 253 mentioned later is in an unlocked position. However, FIG. 6A is shown in a state (locked state) where the lock lever 253 is in a locked position.

The camera connector 206 of the external lighting device 120 is provided in the bottom (−Y-direction side) of a base part 250 of the external lighting device 120. The camera connector 206 is provided with a shoe mounting leg (shoe plate) 251, the lock pins 252, the lock lever 253, the holding member 254, a connecting plug 256, and a Y-direction holding member 258.

The shoe mounting leg 251 is an engagement member of the external lighting device 120 to engage the camera connector 206 with the accessory shoe 123, and accordingly, is constituted so as to be attachable to and detachable from the engagement member 151 of the accessory shoe 123. Since the shoe mounting leg 251 is subjected to strong stress of external forces, such as pressure and impact, that act on the external lighting device 120, it is formed by manufacturing a metal plate (sheet metal) and has high mechanical strength.

The tripod internal thread 280 is provided in the shoe mounting leg 251. The tripod internal thread 280 is an example of an attachment part that enables attachment to an external member (a camera tripod, for example) other than the accessory shoe device. In this example, the attachment part is a screw hole to which a generally-used tripod external thread is able to screw. Since the tripod internal thread 280 needs a certain engaged amount with the tripod external thread, it is provided in the bottom (−Y-direction end) of the camera connector 206 so as to be concave in the +Y-direction.

As with the shoe mounting leg 251, the tripod internal thread 280 is subjected to strong stress of external forces, such as pressure and impact, that act on the external lighting device 120. Accordingly, the tripod internal thread 280 is formed by an integral construction by applying a drawing process to the shoe mounting leg 251 and has high mechanical strength. It should be noted that the tripod internal thread 280 may be formed by another method, such as a cutting process applied to the shoe mounting leg 251 so as to form an integral construction as long as mechanical strength is securable.

The two lock pins 252 prevent the external lighting device 120 from falling after the shoe mounting leg 251 is engaged with the accessory shoe 123. The lock pins 252 are provided in the shoe mounting leg 251 so as to be movable in the Y-direction. A D-lever (not shown) is fixed to the lock pins 252. The lock lever 253 and Y-direction holding member 258 are members for moving the lock pins 252 and are provided in the holding member 254.

As mentioned by referring to FIG. 3B, the user slides the camera connector 206 of the external lighting device 120 to the accessory shoe 123 of the digital camera 100 from the −Z-direction side toward the +Z-direction side in the state where the lock lever 253 is in the unlocked position. Thereby, the camera connector 206 is engaged with the accessory shoe 123. Although the tip surfaces of the lock pins 252 are minutely projected from the bottom surface (the surface on the +Y-direction side) of the shoe mounting leg 251 as shown in FIG. 6B in the state where the lock lever 253 is in the unlocked position, a projecting amount is set so as not to disturb the engagement.

After that, the user rotates the lock lever 253 from the unlocked position to the locked position. It should be noted that the lock lever 253 is rotatable around an axis in the Y-direction. The rotational operation of the lock lever 253 drives a D-cam part (not shown) so as to move the Y-direction holding member 258 and D-lever by a predetermined distance in the −Y-direction. Then, the lock pins 252 that are engaged with the D-lever move by the predetermined distance in the −Y-direction with movement of the D-lever. In this way, the front ends of the two lock pins 252 are further projected from the surface of the shoe mounting leg 251 in the −Y-direction, and the lock pins 252 are engaged with the two engagement holes 156 provided in the engagement member 151 of the accessory shoe 123. This prevents the external lighting device 120 from falling from the accessory shoe 123.

It should be noted that the two lock pins 252 and two engagement holes 156 have the function to regulate the position of the external lighting device 120 to the digital camera 100 in the Z-direction and the function to secure electrical connection between the digital camera 100 and the external lighting device 120.

The connecting plug 256 is arranged at the front part (the +Z-direction side) of the camera connector 206 and is made from non-conductive material (dielectric material), such as resin material. In this embodiment, the connecting plug 256 and holding member 254 are integrally formed from resin material. That is, the shoe mounting leg 251 has mechanical strength higher than the connecting plug 256 and holding member 254. The connecting plug 256 is a connection member that has a plurality of connection terminals 257 that contact the signal terminals 152a (see FIG. 5C) of the accessory shoe 123 for communication.

The connection terminals 257 correspond to the signal terminals 152a one-to-one. Each of the connection terminals (hereinafter referred to as the connection terminal, simply) 257 has a front end 257a that contacts the corresponding signal terminal 152a. The connection terminal 257 extends to the −Z-direction side from the front end 257a. Moreover, the connection terminal 257 has an extension part 257b that displaces the front end 257a in the Y-direction by elastic deformation caused when the front end 257a contacts the signal terminal 152a. A vertical rising part 257c is formed at the rear end of the extension part 257b in the Z-direction so as to intersect perpendicularly with the extension part 257b. A flexible-substrate connection part 257d is formed at the upper end of the vertical rising part 257c. The flexible-substrate connection part 257d contacts the flexible substrate 259 connected to the main substrate (not shown) of the external lighting device 120 when the flexible substrate 259 is inserted.

It should be noted that each of the connection terminals 257 has an inclination part 257e in an approximately central part of the extension part 257b. That is, the extension part 257b is provided with a step in the Y-direction. The extension part 257b is elastically deformable in the Y-direction as mentioned above. However, when a distance L of the extension part 257b is short, a sufficient deformation amount cannot be obtained. In such a case, when attachment and detachment of the signal terminal 152a and the front end 257a are repeated, they will be easily damaged, and sufficient durability may not be obtained.

Consequently, the inclination part 257e is provided in the extension part 257b so that the step will be formed in the approximately central part of the extension part 257b in the Y-direction. This enables to keep the sufficient distance L without interfering with the extension part 257b. Moreover, since the step by the inclination part 257*e* enables to secure a sufficient creeping distance from the front end 257*a* to the vertical part 257*c*, the distance L can be shortened as compared with a case that would secure the same creeping distance without providing a step.

Figure 7:
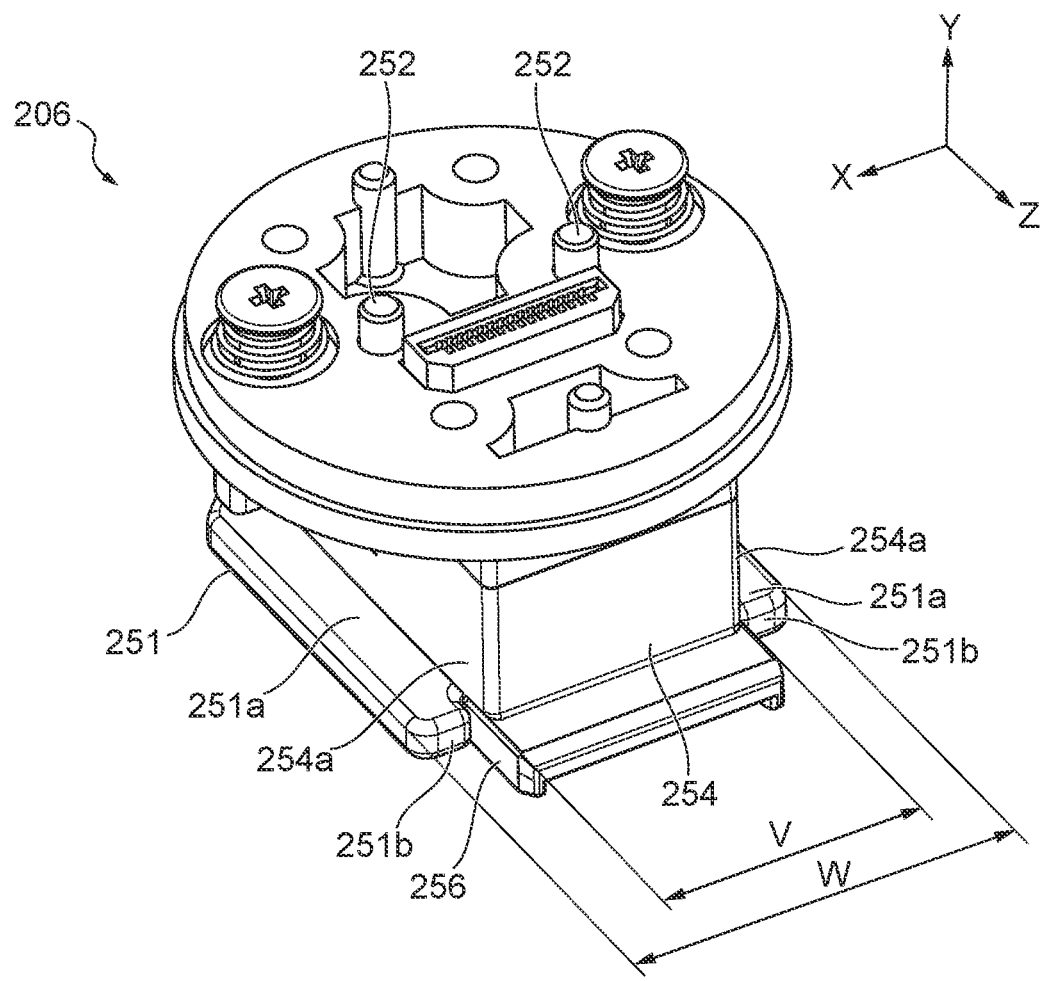
FIG. 7 is a perspective view showing an internal structure of a camera connector of the external lighting device in FIG. 6A.

FIG. 7 is a perspective view showing the internal structure of the camera connector 206 and shows a state where the base part 250 and lock lever 253 have been detached from the camera connector 206. The camera connector 206 is configured by fastening the shoe mounting leg 251 and the holding member 254. It should be noted that details of the fastening structure between the shoe mounting leg 251 and holding member 254 will be mentioned later.

The holding member 254 has a connection part 254*a* that is insertable (engageable) into the engaged part space T of the engaged member 151 (see FIG. 5A). The width V of the connection part 254*a* is shorter than the width W of the shoe mounting leg 251. It should be noted that the holding member 254 is also a structure for connecting the base part 250 with the shoe mounting leg 251. The lock pins 252 and connection terminals 257 are arranged inside the connection part 254*a*.

The position in the X-direction of the external lighting device 120 with respect to the digital camera 100 is settled when the connection part 254*a* is engaged with the engaged member 151 of the accessory shoe 123. Moreover, when contacting the elastic deformation parts 154*a* of the accessory shoe spring 154 (see FIG. 4A and FIG. 4B), the shoe mounting leg 251 is energized in the +Y-direction and shoe fitting parts 251*a* contact the engaged member 151. This settles the position in the Y-direction of the external lighting device 120 with respect to the digital camera 100. Furthermore, when the abutting face 251*b* formed in the shoe mounting leg 251 abuts with the pair of abutting faces 154*b* provided in the accessory shoe spring 154, the position in the Z-direction of the external lighting device 120 with respect to the digital camera 100 is settled. In this way, the external lighting device 120 is positioned to the digital camera 100 and is strongly held.

Figure 8A:
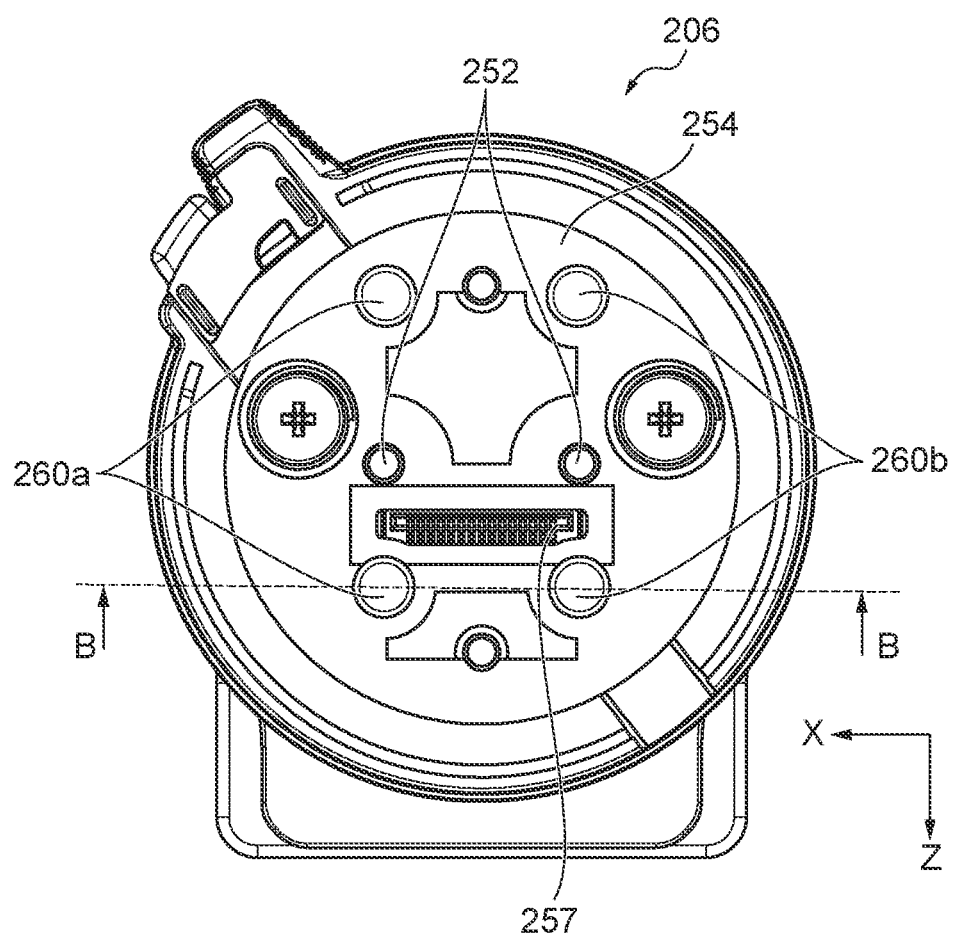
FIG. 8A is a top view of the camera connector in FIG. 7.
Figure 8B:
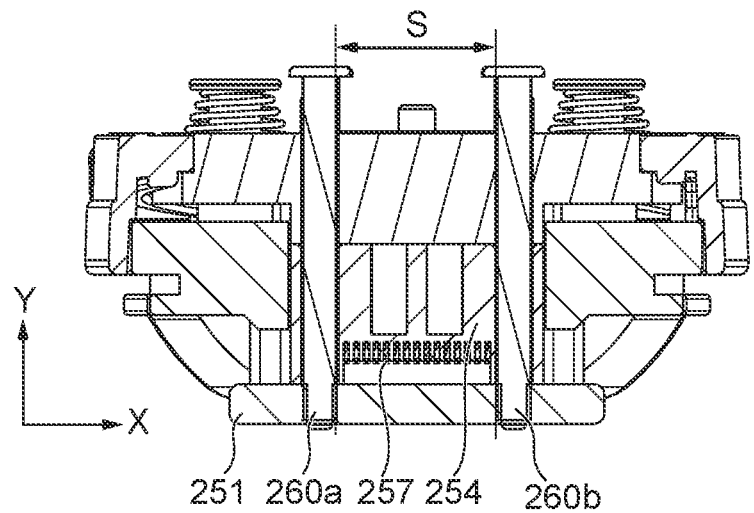
FIG. 8B is a sectional view showing the camera connector taken along a line B-B in FIG. 8A.

Next, the fastening structure of the holding member 254 and the shoe mounting leg 251 will be described. FIG. 8A is a top view (viewed from the +Y-direction side) showing the camera connector 206. FIG. 8B is a sectional view showing the camera connector 206 taken along the line B-B in FIG. 8A.

A pair of first screws 260*a* and a pair of second screws 260*b* are fastening members that are screwed to the shoe mounting leg 251 through the holding member 254 so as to fasten the shoe mounting leg 251 to the holding member 254. The shoe mounting leg 251 is held by the holding member 254 with sufficient balance by respectively arranging the four screws to four areas that are equally divided in the X-direction and the Z-direction.

As mentioned above, strong stress is applied to the shoe mounting leg 251. Against this, necessary mechanical strength is kept by fastening the metal-made shoe mounting leg 251 to the holding member 254 with the pair of first screws 260*a* and the pair of second screws 260*b* that are arranged with sufficient balance. Moreover, the connection terminals 257 are arranged on the +Z-direction side of the camera connector 206 in an area S surrounded by the pair of first screws 260*a* and pair of second screws 260*b*. And the tripod internal thread 280 (see FIG. 6A) is arranged on the −Z-direction side of the camera connector 206 in the area S. This enables multipolarization, which enables arrangement of the many connection terminals 257, and enables attachment/detachment of the external lighting device 120 to a general camera tripod etc., while maintaining the mechanical strength in the state where the shoe mounting leg 251 is engaged with the holding member 254.

Moreover, the area for providing the tripod internal thread 280 is secured on the −Z-direction side of the camera connector 206 by shortening the distance L (see FIG. 6B) by providing the step in the Y-direction in the extension part 257*b* of the connection terminal 257 as mentioned above. Furthermore, the two lock pins 252 attached to the shoe mounting leg 251 are arranged in the area S and are respectively arranged in two areas that equally divide the shoe mounting leg 251 in the X-direction. In this way, the mechanical strength of the shoe mounting leg 251 can be raised by arranging the two lock pins 252 with sufficient balance.

Next, a second embodiment will be described. Since the area for arranging many connection terminals and components for protecting them in an accessory shoe equipped with many connection terminals is restricted as mentioned above, it is not easy to secure sufficient performance and durability. In regard to this, the second embodiment describes a configuration of an accessory shoe that secures an area for arranging connection terminals and components for protecting them and enables arrangement and protection of the connection terminals in a camera connector (shoe device).

Although the accessory shoe according to the second embodiment is denoted by a reference numeral 123A for convenience of description, components that are identical to the components of the accessory shoe 123 described in the first embodiment are described using the same names and reference numerals. Moreover, although a camera connector of an accessory that is attachable to and detachable from the accessory shoe 123A is denoted by a reference numeral 206A, components that are identical to the components of the camera connector 206 described in the first embodiment are described using the same names and reference numerals.

Figure 9:
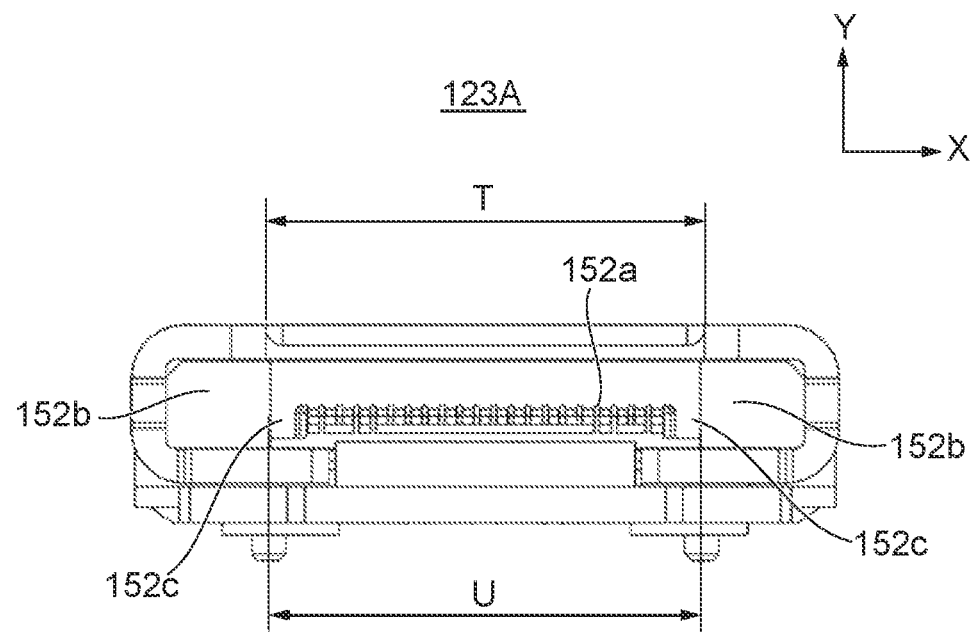
FIG. 9 is a back view showing an accessory shoe device according to a second embodiment.

FIG. 9 is a back view (viewed from the −Z-direction side) showing the engagement part 151 and signal terminal connector 152 that constitutes the accessory shoe 123A. The signal terminal connector 152 is provided with a plurality of signal terminals 152*a* that are juxtaposed at equal pitches in the X-direction in a connector base member formed from resin material. The signal terminals 152*a* are arranged in the signal terminal connector 152 on the +Z-direction side from which the accessory will be attached. Then, grooves (concave parts) 152*c* into which a terminal protection part (mentioned later in detail) of the camera connector 206A is inserted are formed in the signal terminal connector 152 on both sides (±X-direction sides) of the signal terminals 152*a* so as to interpose the signal terminals 152*a* in the X-direction. Furthermore, the signal terminal connector 152 is provided with abutting faces 152*b* on the ±X-direction sides of the grooves 152*c*. The abutting faces 152*b* contact the accessory in the Z-direction at the time of attachment and position the accessory in the Z-direction.

The two grooves 152*c* are formed by cutting parts of the abutting faces 152*b* to have a width U so as to interpose the signal terminals 152*a*. The two grooves 152*c* are provided inside the engagement part space T of the engagement member 151 (see FIG. 5A) in the X-direction. That is, the engagement part space T and the width U satisfy a relationship of T>U, and thereby, the areas of the abutting faces 152*b* are sufficiently secured and the strong mounting state is achieved.

Figure 10:
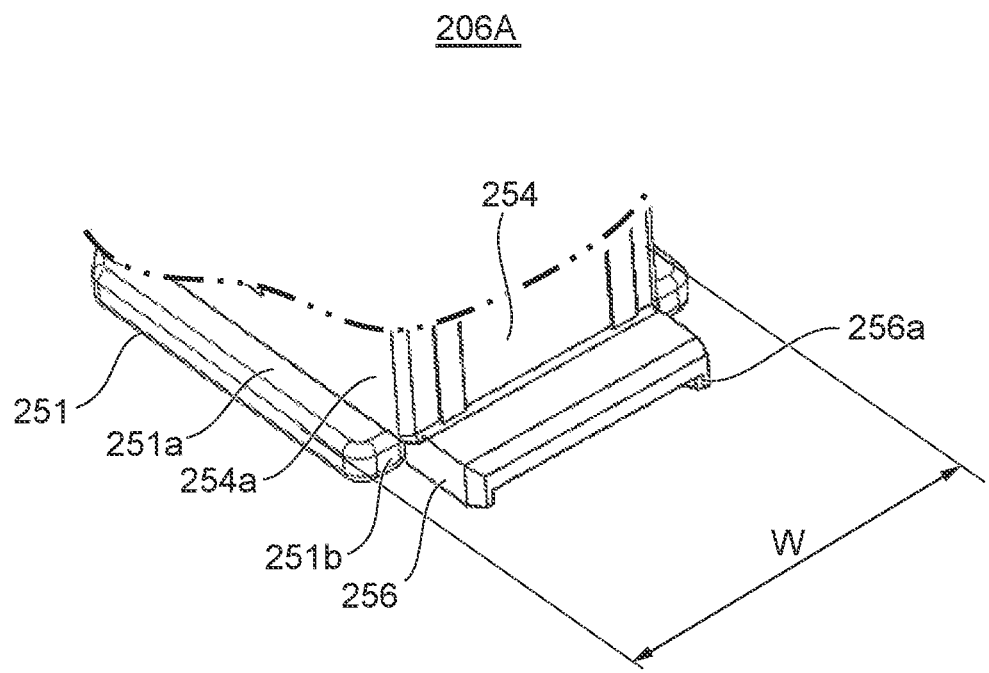
FIG. 10 is a partial perspective view showing a camera connector that is attachable to and detachable from the accessory shoe device in FIG. 9.

FIG. 10 is a partial perspective view showing the camera connector 206A that is attachable to and detachable from the accessory shoe 123A in FIG. 9. The holding member 254 constituting the camera connector 206A is formed so as to be insertable (finable) into the opening (inside the engagement part space T) of the engagement member 151. Moreover, the holding member 254 has the connection part 254a constituted inside the width W of the shoe mounting leg 251. The connecting plug 256 constituting the camera connector 206A is provided with terminal protection parts 256a so as to interpose the connection terminals 257 (not shown in FIG. 10) in the X-direction.

The position in the X-direction of the accessory with respect to the digital camera 100 is settled when the connection part 254a is engaged with the engaged member 151 of the accessory shoe 123A. Moreover, when contacting the elastic deformation parts 154a of the accessory shoe spring 154 (see FIG. 4A and FIG. 4B), the shoe mounting leg 251 is energized in the +Y-direction and the shoe fitting parts 251a contact the engaged member 151. This settles the position in the Y-direction of the accessory with respect to the digital camera 100. Furthermore, when the abutting face 251b formed in the shoe mounting leg 251 abuts with the abutting faces 152b (see FIG. 9) provided in the signal terminal connector 152, the position in the Z-direction of the accessory with respect to the digital camera 100 is settled. In this way, the accessory is positioned to the digital camera 100 and is strongly held. At this time, the terminal protection parts 256a of the connecting plug 256 are respectively inserted and fitted into the grooves 152c provided on the ±X-direction sides of the signal terminals 157a of the accessory shoe 123A, which protects the signal terminals 157a and the connection terminals of the accessory.

Next, a third embodiment will be described. It should be noted that other examples of the camera connector 206 of the external lighting device will be described in the third through tenth embodiments. In that time, the names and reference numerals of the camera connector and its components and parts in the first embodiment will be used for the camera connector (shoe device) and its components and parts of the following embodiments. However, in order to distinguish a camera connector of every embodiment, an external lighting device is denoted by a reference numeral 120B and a camera connector is denoted by a reference numeral 206B in the third embodiment for convenience of description.

Figure 11A:
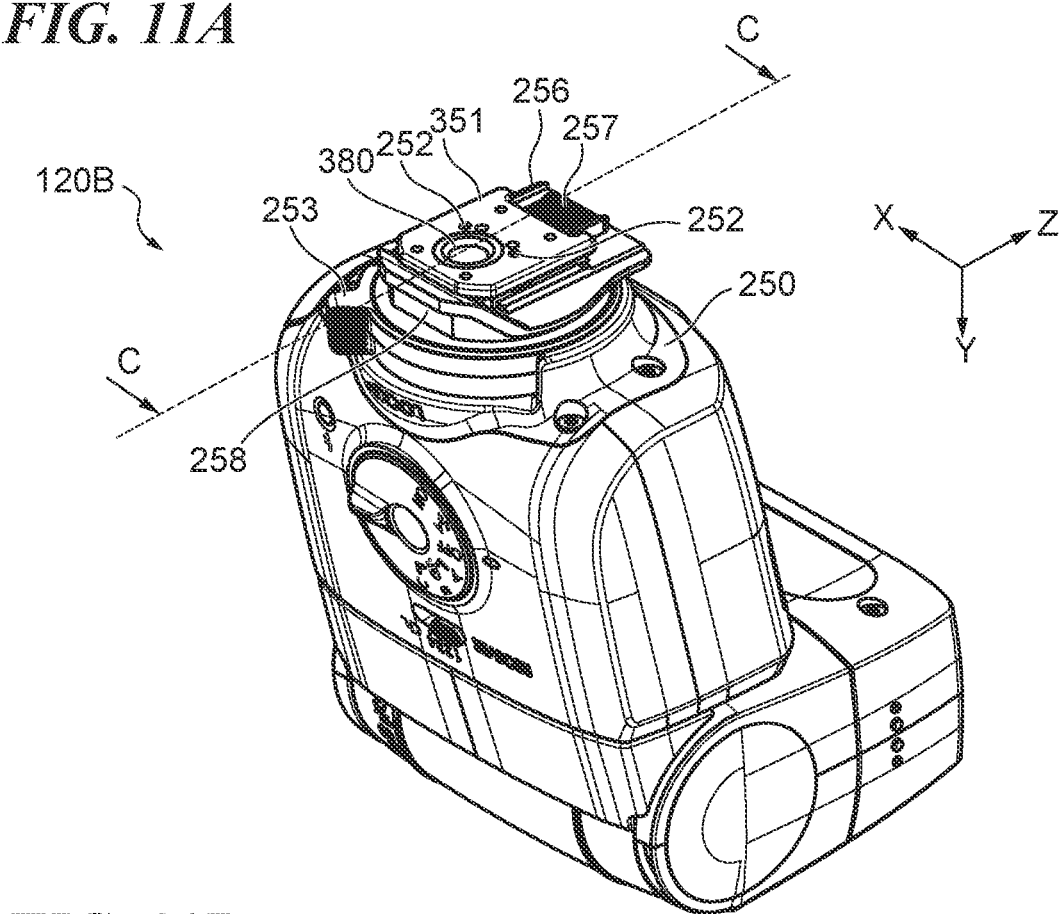
FIG. 11A is a perspective view showing an external lighting device according to a third embodiment.
Figure 11B:
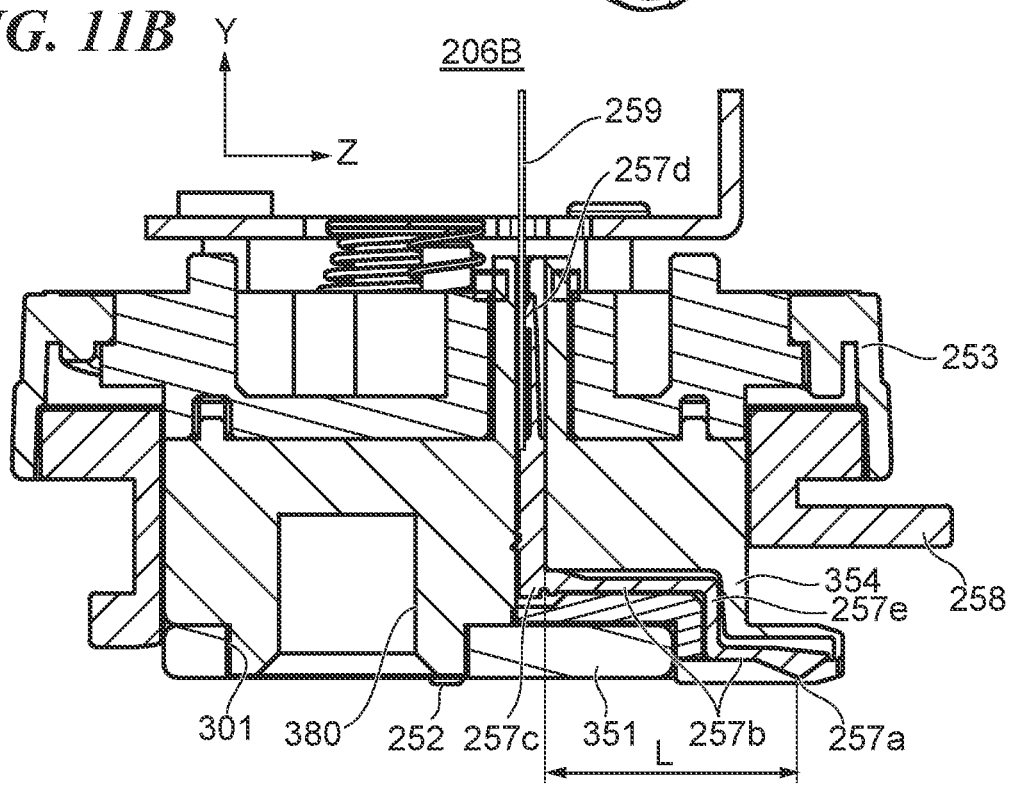
FIG. 11B is a sectional view showing the external lighting device shown in FIG. 11A taken along a line C-C.

FIG. 11A is a perspective view showing the external lighting device 120B according to the third embodiment. FIG. 11B is a sectional view showing the external lighting device 120B shown in FIG. 11A taken along a line C-C and shows an internal structure of the camera connector 206B in a state where the lock lever 253 is in an unlocked position. It should be noted that FIG. 11A and FIG. 11B correspond to FIG. 6A and FIG. 6B used for the description of the first embodiment.

The camera connector 206B of the external lighting device 120B is provided in the bottom of the base part 250 of the external lighting device 120B in a regular mounting state to the accessory shoe 123 of the digital camera 100. The camera connector 206B is provided with a shoe mounting leg (shoe plate) 351, a tripod internal thread 380, the two lock pins 252, the lock lever 253, a holding member 354, the connecting plug 256, and the Y-direction holding member 258.

The shoe mounting leg 351 is the engagement member of the camera connector 206B and is constituted so as to be attachable to and detachable from the engagement member 151 in order to engage the camera connector 206B with the engagement member 151 of the accessory shoe 123. Since the shoe mounting leg 251 is subjected to strong stress of external forces, such as pressure and impact, that act on the external lighting device 120, it is formed by manufacturing a metal plate (sheet metal) and has high mechanical strength. The shoe mounting leg 351 is provided with an opening 301 that engages with the part in which the tripod internal thread 380 is formed in the holding member 354.

The holding member 354 is a structure that connects the base part 250 and the shoe mounting leg 351. Although the shoe mounting leg 251 and the tripod internal thread 280 are integrally formed in the first embodiment, the holding member 354 and the tripod internal thread 380 are integrally formed according to this embodiment. The tripod internal thread 380 is a threaded hole to which a tripod screw, which is generally used not only to the accessory shoe 123 but to a camera tripod, can be screwed in the Y-direction.

As with the shoe mounting leg 351, the tripod internal thread 380 formed in the holding member 354 is subjected to strong stress of external forces, such as pressure and impact, that act on the external lighting device 120B. Accordingly, the tripod internal thread 380 is formed by manufacturing the holding member 354 that is made from material securing high mechanical strength. For example, the holding member 354 is made from non-conductive fiber-glass reinforced plastic (FRP) that is made by blending glass fiber with nylon resin.

It should be noted that the shoe mounting leg 351 engaged with the holding member 354 is made from metal material in this embodiment in order securing mechanical strength. However, such a configuration is not necessarily required. The shoe mounting leg 351 and the holding member 354 having the tripod internal thread 380 may be integrally formed in cases where accessories, such as a compact flash and an electronic view finder, do not require relatively high mechanical strength.

Next, a fourth embodiment will be described. In the fourth embodiment, an external lighting device is denoted by a reference numeral 120C and a camera connector is denoted by a reference numeral 206C for convenience of description.

Figure 12A:
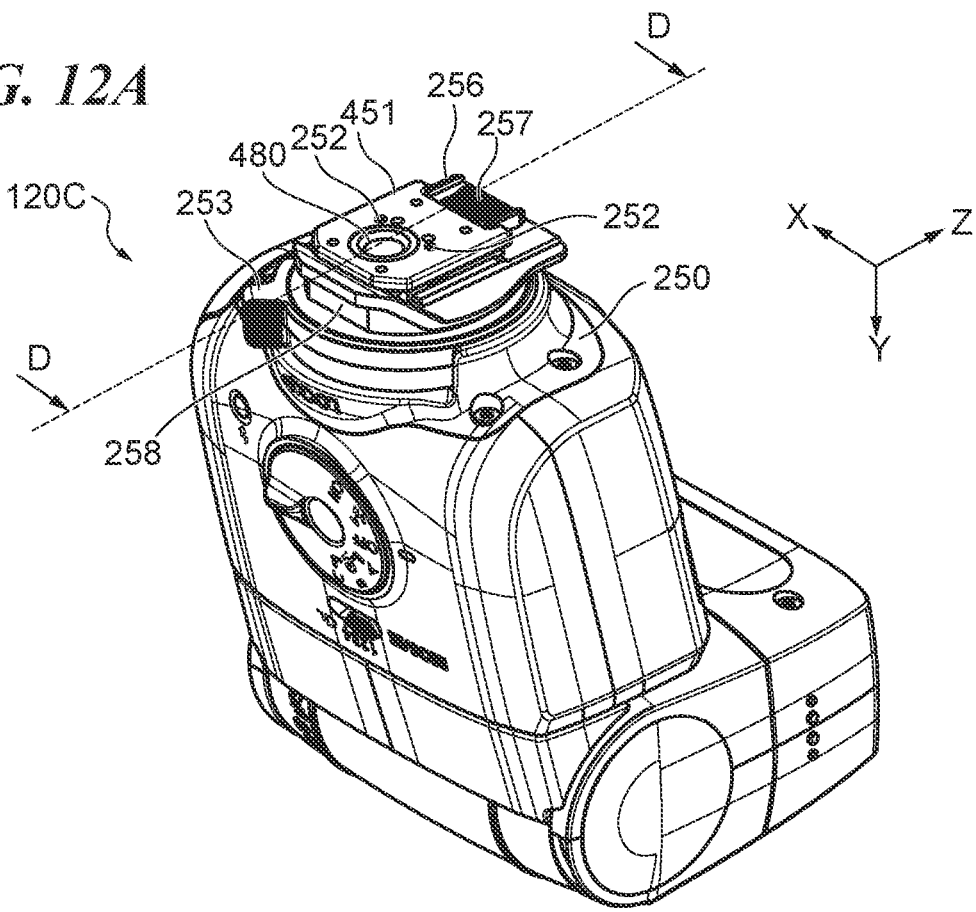
FIG. 12A is a perspective view showing an external lighting device according to a fourth embodiment.
Figure 12B:
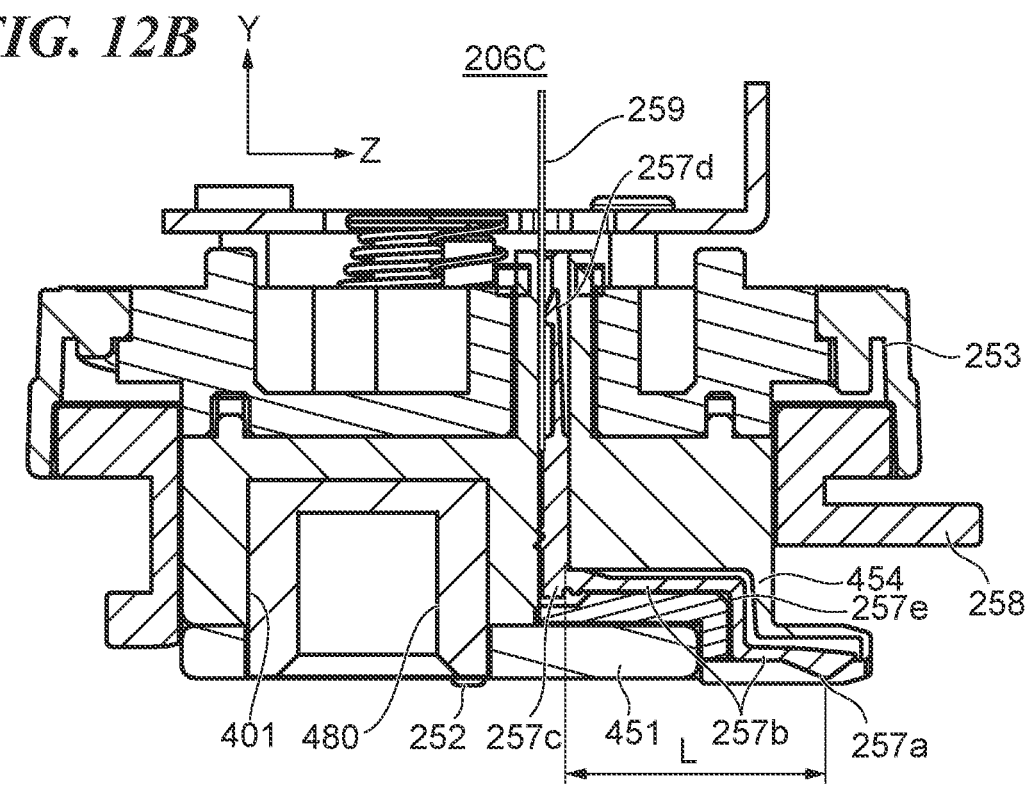
FIG. 12B is a sectional view showing the external lighting device shown in FIG. 12A taken along a line D-D.

FIG. 12A is a perspective view showing the external lighting device 120C according to the fourth embodiment. FIG. 12B is a sectional view showing the external lighting device 120C shown in FIG. 12A taken along a line D-D and shows an internal structure of the camera connector 206C in the state where the lock lever 253 is in the unlocked position. It should be noted that FIG. 12A and FIG. 12B correspond to FIG. 6A and FIG. 6B used for the description of the first embodiment.

The camera connector 206C of the external lighting device 120C is provided in the bottom of the base part 250 of the external lighting device 120C in the regular mounting state to the accessory shoe 123 of the digital camera 100. The camera connector 206C is provided with a shoe mounting leg (shoe plate) 451, a tripod internal thread member 480, the lock pins 252, the lock lever 253, a holding member 454, the connecting plug 256, and the Y-direction holding member 258.

The shoe mounting leg 451 is the engagement member of the camera connector 206C and is constituted so as to be attachable to and detachable from the engagement member 151 in order to engage the camera connector 206C with the engagement member 151 of the accessory shoe 123. Since the shoe mounting leg 451 is subjected to strong stress of external forces, such as pressure and impact, that act on the external lighting device 120C, it is formed by manufacturing a metal plate (sheet metal) and has high mechanical strength.

The holding member 454 is a structure that connects the base part 250 and the shoe mounting leg 451. The holding member 454 is formed by non-conductive material (dielectric material) like resin material, for example. The tripod internal thread member 480 is the attachment member that has a threaded hole to which a tripod screw, which is generally used not only to the accessory shoe 123 but to a camera tripod, can be screwed in the Y-direction. The tripod internal thread member 480 is engaged with the holding member 454 in a state where rotation relative to the holding member 454 around an axis in the Y-direction is regulated (a configuration regulating rotation is not shown), and its position in the Y-direction is also regulated by the holding member 454.

As with the shoe mounting leg 451, the tripod internal thread member 480 is subjected to strong stress of external forces, such as pressure and impact, that act on the external lighting device 120C. Accordingly, the tripod internal thread member 480 is made from metal or FRP that can secure high mechanical strength. Moreover, the shoe mounting leg 451 is provided with an opening 401 that engages with an outer diameter surface of the tripod internal thread member 480. The tripod internal thread member 480 is held with the holding member 454 and shoe mounting leg 451 by engaging the tripod internal thread member 480 with the holding member 454 and then engaging the shoe mounting leg 451 with the tripod internal thread member 480.

Next, a fifth embodiment will be described. In the fifth embodiment, an external lighting device is denoted by a reference numeral 120D and a camera connector is denoted by a reference numeral 206D for convenience of description.

Figure 13A:
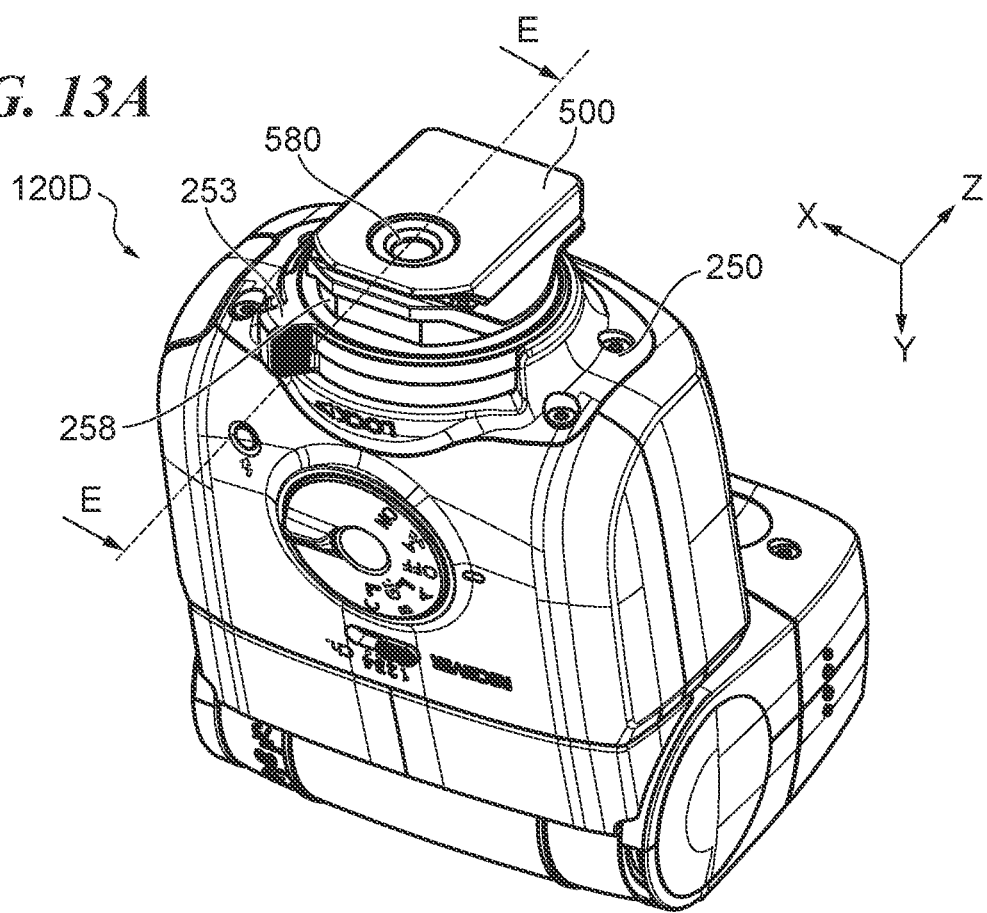
FIG. 13A is a perspective view showing an external lighting device according to a fifth embodiment.
Figure 13B:
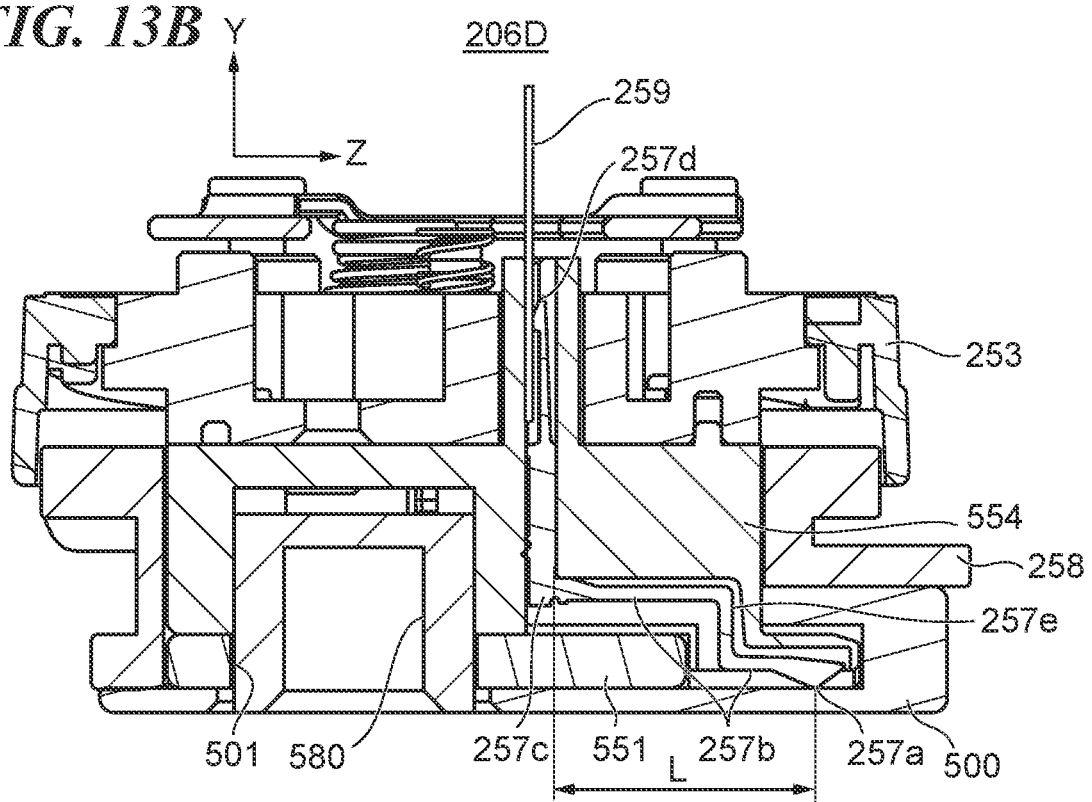
FIG. 13B is a sectional view showing the external lighting device shown in FIG. 13A taken along a line E-E.

FIG. 13A is a perspective view showing the external lighting device 120D according to the fifth embodiment and shows a state where a terminal protection member 500 mentioned later is attached. FIG. 13B is a sectional view showing the external lighting device 120D shown in FIG. 13A taken along a line E-E and shows an internal structure of the camera connector 206D in the state where the lock lever 253 is in the unlocked position. It should be noted that FIG. 13A and FIG. 13B correspond to FIG. 6A and FIG. 6B used for the description of the first embodiment.

The camera connector 206D of the external lighting device 120D is provided in the bottom of the base part 250 of the external lighting device 120D in the regular mounting state to the accessory shoe 123 of the digital camera 100. The camera connector 206D is provided with a shoe mounting leg (shoe plate) 551, a tripod internal thread member 580, the lock pins 252, the lock lever 253, a holding member 554, the connecting plug 256, the Y-direction holding member 258, and the terminal protection member 500.

The shoe mounting leg 551 is the engagement member of the camera connector 206D and is constituted so as to be attachable to and detachable from the engagement member 151 in order to engage the camera connector 206D with the engagement member 151 of the accessory shoe 123. Since the shoe mounting leg 551 is subjected to strong stress of external forces, such as pressure and impact, that act on the external lighting device 120D, it is formed by manufacturing a metal plate (sheet metal) and has high mechanical strength.

The holding member 554 is a structure that connects the base part 250 and the shoe mounting leg 551. The holding member 554 is formed by non-conductive material (dielectric material) like resin material, for example. The tripod internal thread member 580 is a mounting member that has a threaded hole to which a tripod screw, which is generally used not only to the accessory shoe 123 but to a camera tripod, can be screwed in the Y-direction. The tripod internal thread member 580 is engaged with the holding member 554 in the state where rotation to the holding member 554 around an axis in the Y-direction is regulated. It should be noted that a configuration for regulating the position of the tripod internal thread member 580 in the Y-direction will be mentioned later.

The terminal protection member 500 protects the connection terminals 257 from external forces, such as pressure and impact, and foreign substances, such as dust and waterdrop, in a state where the external lighting device 120D is not attached to the digital camera 100 The terminal protection member 500 can be engaged with the shoe mounting leg 551 and is attachable to and detachable from the shoe mounting leg 551. When the external lighting device 120D is attached to the digital camera 100 (when the connection terminals 257 are connected to the signal terminals 152a of the accessory shoe 123), the terminal protection member 500 is detached from the camera connector 206D.

The terminal protection member 500 is provided with an opening corresponding to the position of the tripod internal thread member 580 (an opening 501 of the shoe mounting leg 551), and the bottom surface (surface on the −Y-direction side) of the tripod internal thread member 580 is exposed to the external appearance. Thereby, an external thread of a camera tripod can be screwed to the threaded hole of the tripod internal thread member 580 in the state where the terminal protection member 500 is attached.

When the lock lever 253 is rotationally operated from the unlocked position to the locked position in the state where the terminal protection member 500 is attached to the camera connector 206D, the lock pins 252 (not shown in FIG. 13B) are projected in the −Y-direction but are stopped at the positions where the lock pins 252 are abutted with the terminal protection member 500. Simultaneously, the tripod internal thread member 580 is moved by the D-cam part (not shown) in the −Y-direction by a distance equivalent to the thickness of the terminal protection member 500 in the Y-direction. This prevents the engaged amount between the external thread of the camera tripod and the tripod internal thread member 580 from decreasing by the thickness of the terminal protection member 500 in the Y-direction.

The tripod internal thread member 580 is energized in the +Y-direction by a D-compression spring (not shown) and is energized in the −Y-direction by the D-cam part. The camera connector 206D is slid to the +Z-direction side from the −Z-direction side to the accessory shoe 123 in the state where the terminal protection member 500 is not attached to the camera connector 206D and the lock lever 253 is in the unlocked position. Thereby, the camera connector 206 is engaged with the accessory shoe 123. After that, when the lock lever 253 is rotationally operated from the unlocked position to the locked position, the lock pins 252 engage with the engagement holes 156 of the accessory shoe 123. At this time, although the tripod internal thread member 580 is moved by the D-cam part in the −Y-direction, it is configured to stop at the position abutting with the engagement member 151 of the accessory shoe 123.

In the camera connector 206D of the external lighting device 120D, the tripod internal thread member 580 moves to a suitable position in the Y-direction in accordance with a usage status. This secures the high mechanical strength by keeping the constant engaged amount to the tripod internal thread member 580. As a result, occurrence of breakage of the camera connector 206D due to stress of external forces, such as pressure and impact, that act on the external lighting device 120D is avoidable.

Next, a sixth embodiment will be described. In the sixth embodiment, an external lighting device is denoted by a reference numeral 120E and a camera connector is denoted by a reference numeral 206E for convenience of description.

Although the first through fifth embodiments describe the configuration that mounts the tripod internal thread in the external lighting device, this embodiment describes the external lighting device 120E equipped with the camera connector 206E that replaces the tripod internal thread with a tripod external thread as the attachment part. Since the tripod external thread is mounted, the external lighting device 120E can be fixed to various devices, such as a digital camera, and a stand that have a tripod internal thread. For example, since the tripod external thread of the external lighting device 120E can be fixed to the tripod internal thread that is provided in the bottom face of the digital camera 100, more accessories are attachable to the digital camera 100. It should be noted that an accessory equipped with a camera connector that mounts a tripod external thread is not restricted to an external lighting device but may be an external display device or a transmitter that wirelessly controls an external lighting device.

Figure 14A:
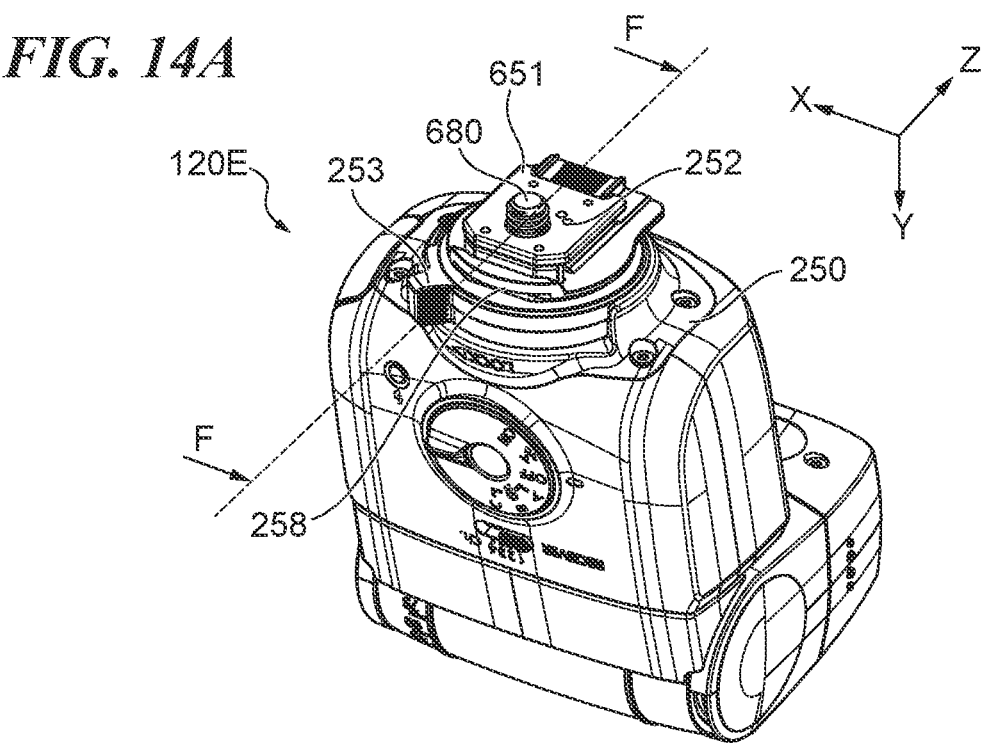
FIG. 14A is a perspective view showing an external lighting device according to a sixth embodiment.
Figure 14B:
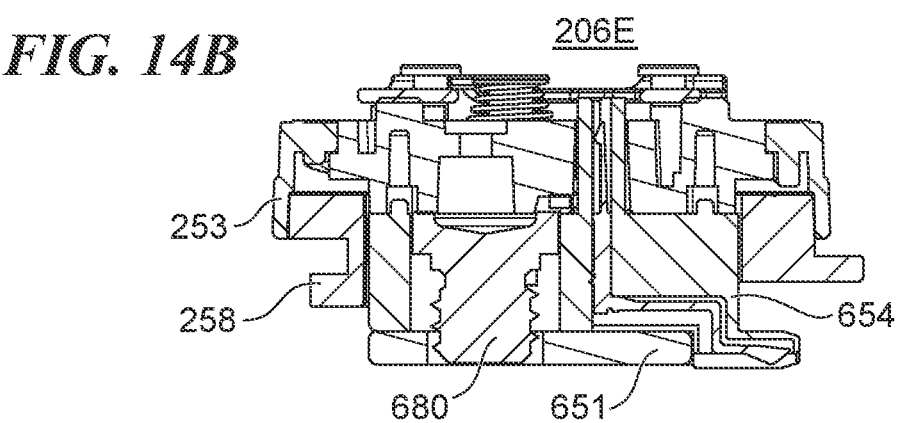
FIG. 14B and FIG. 14C are sectional views showing the external lighting device shown in FIG. 14A taken along a line F-F.
Figure 14C:
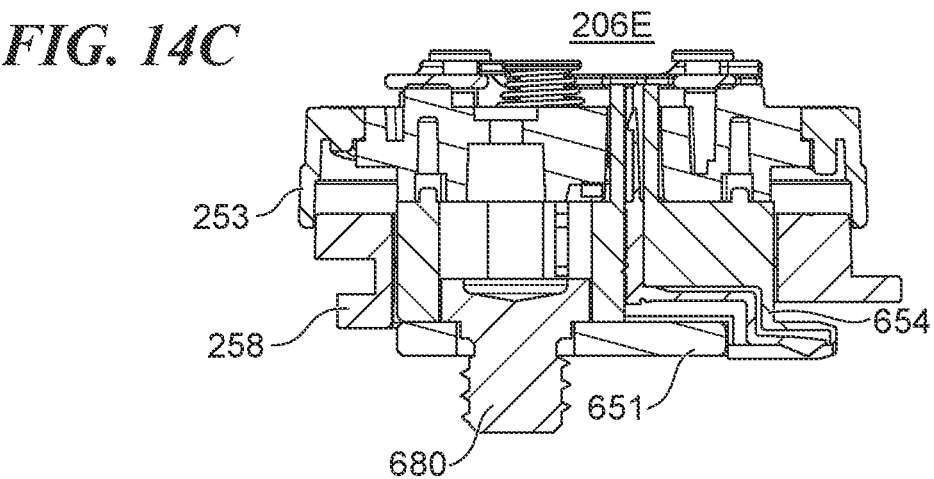

FIG. 14A is a perspective view showing the external lighting device 120E according to the sixth embodiment. FIG. 14B and FIG. 14C are sectional views showing the external lighting device 120E shown in FIG. 14A taken along a line F-F. FIG. 14B shows an internal structure of the camera connector 206E in the state where the lock lever 253 is in the unlocked position. Moreover, FIG. 14C shows the internal structure of the camera connector 206E in the state (locked state) where the lock lever 253 is in the locked position. It should be noted that FIG. 14A and FIG. 14C correspond to FIG. 6A and FIG. 6B used for the description of the first embodiment.

The camera connector 206D of the external lighting device 120E is provided in the bottom of the base part 250 of the external lighting device 120E in the regular mounting state to the accessory shoe 123 of the digital camera 100. The camera connector 206E is provided with a shoe mounting leg 651, a tripod external thread member 680, the lock pins 252, the lock lever 253, a holding member 654, and the Y-direction holding member 258.

The shoe mounting leg 651 is the engagement member of the camera connector 206E and is constituted so as to be attachable to and detachable from the engagement member 151 in order to engage the camera connector 206E with the engagement member 151 of the accessory shoe 123. Since the shoe mounting leg 651 is subjected to strong stress of external forces, such as pressure and impact, that act on the external lighting device 120E, it is formed by manufacturing a metal plate (sheet metal) and has high mechanical strength.

The holding member 654 is a structure that connects the base part 250 and the shoe mounting leg 651. The holding member 654 is formed by non-conductive material (dielectric material) like resin material, for example. The tripod external thread member 680 has a shape that can be screwed to the internal thread that is provided in the bottom surface of the digital camera 100. The tripod external thread member 680 is engaged with the holding member 654 in the state where rotation to the holding member 654 around an axis in the Y-direction is regulated.

The tripod external thread member 680 is energized in the +Y-direction by the D-compression spring (not shown) and is energized in the −Y-direction by the D-cam part (not shown). If the tripod external thread member 680 is projected from the bottom surface of the shoe mounting leg 651 in the −Y-direction in the state where the lock lever 253 is in the unlocked position, the tripod external thread member 680 will interfere with the accessory shoe 123 and the camera connector 206E cannot be engaged with the accessory shoe 123. In order not to cause such a problem, when the lock lever 253 is in the unlocked position, the tripod external thread member 680 is energized by the D-compression spring in the +Y-direction and keeps the state where the tripod external thread member 680 is stored inside the camera connector 206E as shown in FIG. 14B. Accordingly, the camera connector 206E can be engaged with the accessory shoe 123 in the state where the lock lever 253 is in the unlocked position.

After engaging the camera connector 206E to the accessory shoe 123, the lock lever 253 is rotationally operated from the unlocked position to the locked position. Thereby, the Y-direction holding member 258 moves in the −Y-direction. Simultaneously, the tripod external thread member 680 also moves in the −Y-direction by the D-cam part that energizes the tripod external thread member 680 in the −Y-direction and stops in the position abutting with the engagement member 151 of the accessory shoe 123.

The user operates the lock lever 253 to the locked position before fixing the external lighting device 120E to the internal thread of the digital camera 100, a stand, or a tripod that has an internal thread. Thereby, the tripod external thread member 680 is projected from the bottom surface of the shoe mounting leg 651 in the −Y-direction as shown in FIG. 14C. Thereby, the tripod external thread member 680 can be screwed to the tripod internal thread of the digital camera 100, etc.

In this way, since the tripod external thread member 680 of the external lighting device 120E moves to a suitable position in accordance with a usage status, the high mechanical strength is securable by keeping the constant engaged amount to the tripod external thread member 680. As a result, occurrence of breakage of the camera connector 206E due to stress of external forces, such as pressure and impact, that act on the external lighting device 120E is avoidable.

Next, a seventh embodiment will be described. In the seventh embodiment, an external lighting device is denoted by a reference numeral 120F and a camera connector is denoted by a reference numeral 206F for convenience of description.

Figure 15A:
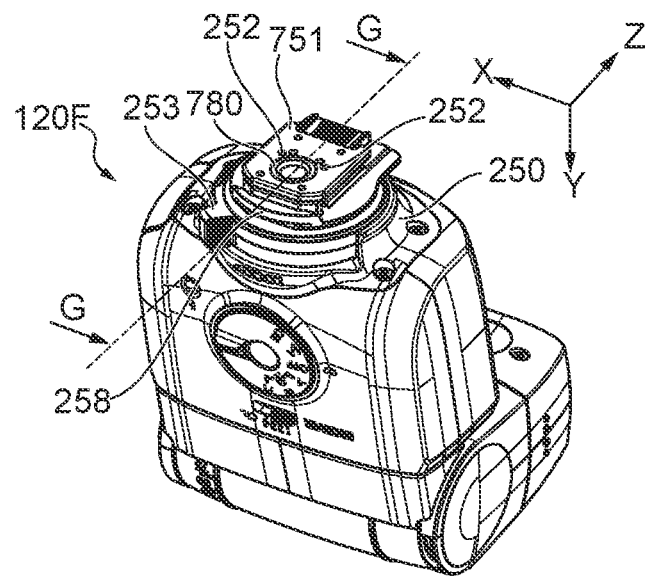
FIG. 15A is a perspective view showing an external lighting device according to a seventh embodiment.
Figure 15B:
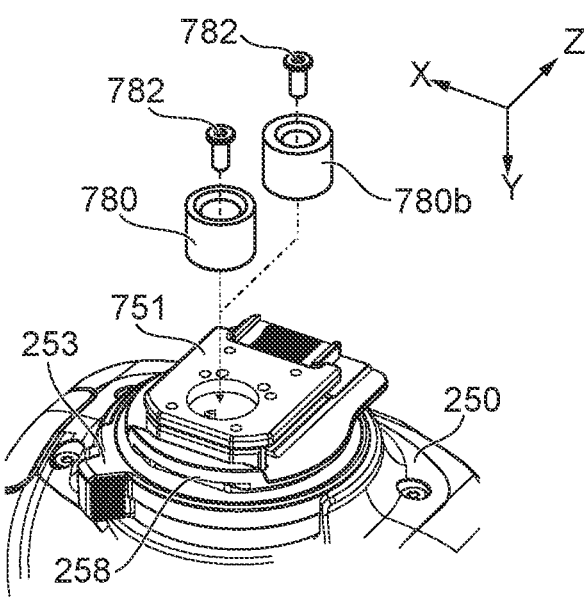
FIG. 15B is a partial exploded perspective view showing a camera connector in the external lighting device shown in FIG. 15A.
Figure 15C:
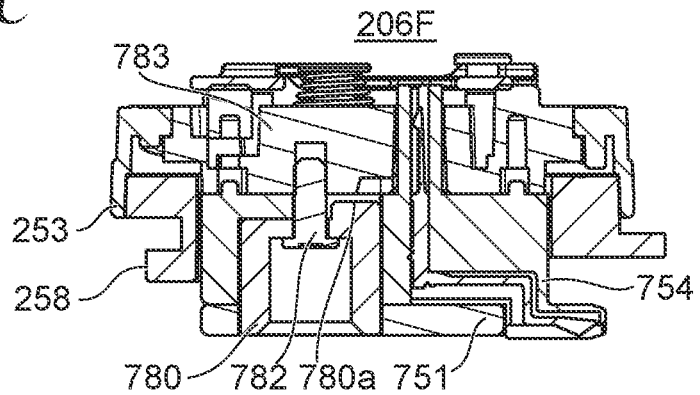
FIG. 15C is a sectional view showing the external lighting device shown in FIG. 15A taken along a line G-G.

FIG. 15A is a perspective view showing the external lighting device 120F according to the seventh embodiment. FIG. 15B is a partial exploded perspective view showing the camera connector 206F of the external lighting device 120F. FIG. 15C is a sectional view taken along a line G-G in FIG. 15A and shows an internal structure of the camera connector 206F in the state where the lock lever 253 is in the unlocked position. It should be noted that FIG. 15A and FIG. 15C correspond to FIG. 6A and FIG. 6B used for the description of the first embodiment.

The camera connector 206F of the external lighting device 120F is provided in the bottom of the base part 250 of the external lighting device 120F in the regular mounting state to the accessory shoe 123 of the digital camera 100. The camera connector 206F is provided with a shoe mounting leg 751, an external engagement member 780, the lock pins 252, the lock lever 253, a holding member 754, and the Y-direction holding member 258.

The shoe mounting leg 751 is the engagement member of the camera connector 206F and is constituted so as to be attachable to and detachable from the engagement member 151 in order to engage the camera connector 206F with the engagement member 151 of the accessory shoe 123. Since the shoe mounting leg 751 is subjected to strong stress of external forces, such as pressure and impact, that act on the external lighting device 120F, it is formed by manufacturing a metal plate (sheet metal) and has high mechanical strength.

The holding member 754 is a structure that connects the shoe mounting leg 751 to the base part 250 and a connecting member 783. The holding member 754 is formed by non-conductive material (dielectric material) like resin material, for example.

The external engagement member 780 is detachably fastened to the connecting member 783 with a fixing screw 782 and is exchangeable according to a target to which the external lighting device 120F is fixed. For example, there is a case where the external lighting device 120F will be attached to a camera tripod with ¼ inch screw thread (International Standard) that is generally used with a digital camera. In this case, the external engagement member 780 in which a ¼-inch internal thread hole is formed is used. The external engagement member 780 has a rotation regulating part 780a that regulates rotation around a center axis that intersects perpendicularly with a radial direction. In the meantime, there is a case where the external lighting device 120F will be attached to a camera tripod with ⅜ inch screw thread (German screw thread) that is used with a large-sized tripod. In this case, the external engagement member 780 in which a ⅜-inch internal thread hole is formed is used. The external engagement member 780 has the rotation regulating part 780a that regulates rotation around the center axis that intersects perpendicularly with the radial direction. Furthermore, when the external lighting device 120F will be attached to a target having magnetism, an external engagement member 780b that consists of a magnet can be used.

When the external engagement member 780 providing the tripod internal thread is screwed to the external thread of the camera tripod, the external engagement member 780 is subjected to strong stress of external forces, such as pressure and impact, that act on the external lighting device 120F. Accordingly, the external engagement member 780 providing the tripod internal thread is preferably made from material (metal or FRP) that secures high mechanical strength as with the shoe mounting leg 751.

In this way, since the external engagement member is selected and used according to a target to which the external lighting device 120F will be attached, versatility and operability are improved.

Next, an eighth embodiment will be described. In the eighth embodiment, an external lighting device is denoted by a reference numeral 120G and a camera connector is denoted by a reference numeral 206G for convenience of description.

Figure 16A:
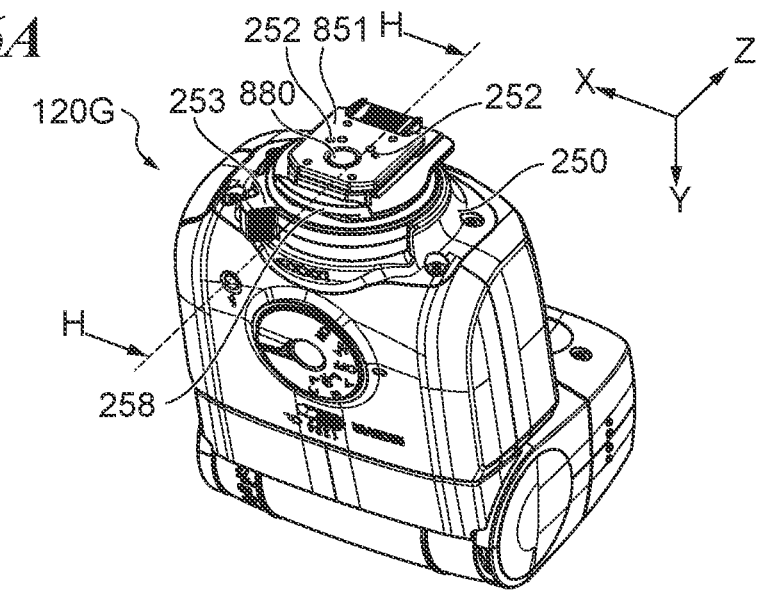
FIG. 16A is a perspective view showing an external lighting device according to an eighth embodiment.
Figure 16B:
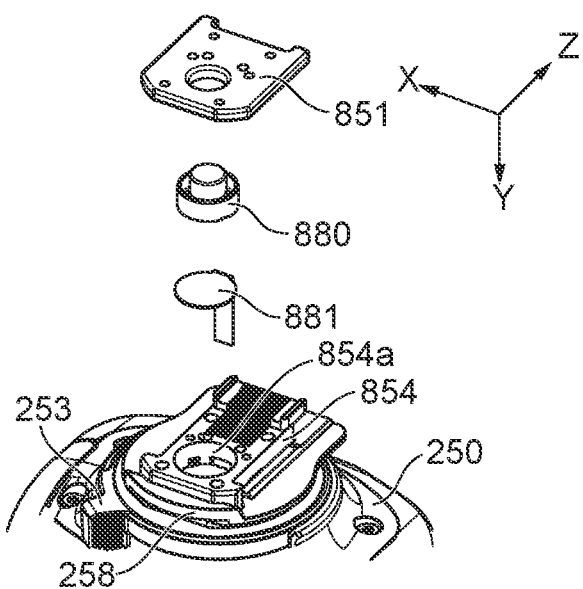
FIG. 16B is a partial exploded perspective view showing a camera connector in the external lighting device shown in FIG. 16A.
Figure 16C:
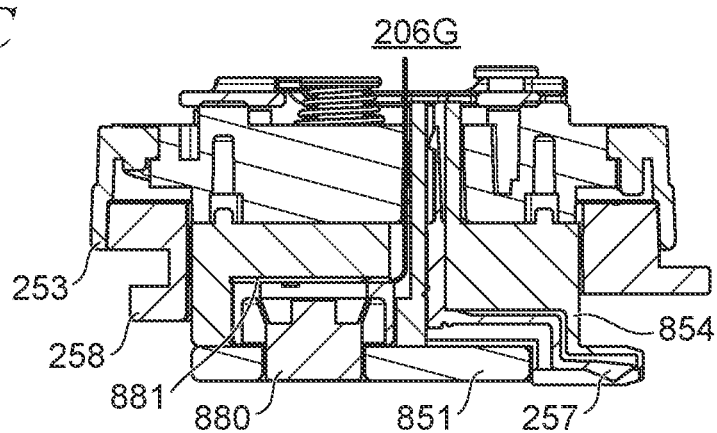
FIG. 16C is a sectional view showing the external lighting device shown in FIG. 16A taken along a line H-H.

FIG. 16A is a perspective view showing the external lighting device 120G according to the eighth embodiment. FIG. 16B is a partial exploded perspective view showing the camera connector 206G of the external lighting device 120G. FIG. 16C is a sectional view taken along a line G-G in FIG. 16A and shows an internal structure of the camera connector 206G in the state where the lock lever 253 is in the unlocked position. It should be noted that FIG. 16A and FIG. 16C correspond to FIG. 6A and FIG. 6B used for the description of the first embodiment.

The camera connector 206G of the external lighting device 120G is provided in the bottom of the base part 250 of the external lighting device 120G in the regular mounting state to the accessory shoe 123 of the digital camera 100. The camera connector 206G is provided with a shoe mounting leg 851, a wireless setting button 880, a detection flexible substrate 881, the lock pins 252, the lock lever 253, a holding member 854, and the Y-direction holding member 258.

The shoe mounting leg 851 is the engagement member of the camera connector 206G and is constituted so as to be attachable to and detachable from the engagement member 151 in order to engage the camera connector 206G with the engagement member 151 of the accessory shoe 123. Since the shoe mounting leg 851 is subjected to strong stress of external forces, such as pressure and impact, that act on the external lighting device 120G, it is formed by manufacturing a metal plate (sheet metal) and has high mechanical strength. Moreover, the shoe mounting leg 851 has a hole into which the wireless setting button 880 is insertable. The wireless setting button 880 is arranged so as to be operatable from the outside of the external lighting device 120G in a state where the external lighting device 120G is independent.

The holding member 854 is a structure that connects the shoe mounting leg 851 and the base part 250 and is formed by non-conductive material (dielectric material), such as resin material. The holding member 854 has a hole 854a into which the wireless setting button 880 is insertable. After engaging the wireless setting button 880 and the detection flexible substrate 881 to the hole 854a of the holding member 854, the shoe mounting leg 851 is engaged with the holding member 854. Thereby, the wireless setting button 880 and the detection flexible substrate 881 are attached to the holding member 854 so as to be interposed between the holding member 854 and the shoe mounting leg 851 in the Y-direction. That is, the positions of the wireless setting button 880 and the detection flexible substrate 881 in the Y-direction are regulated. The detection flexible substrate 881 is connected to the main substrate (not shown) of the external lighting device 120G and transmits a signal corresponding to a press of the wireless setting button 880 to the main substrate.

The external lighting device 120G may be used in order to illuminate an object at the time of image pick-up without attaching to the digital camera 100, . For example, when multi-light photographing is performed using a plurality of external lighting devices, emission amounts, light-emitting timings, etc. of the external lighting device that is attached to the digital camera 100 and the external lighting device that is not attached to the digital camera 100 are controlled by wireless communication at the time of image pickup. At this time, a communication setting (pairing) for wireless communicative connection between the plurality of external lighting devices is needed. Accordingly, the external lighting device 120G easily performs the pairing with other external lighting devices by pressing the wireless setting button 880.

It should be noted that the wireless setting button 880 becomes unnecessary when the external lighting device 120G is attached to the digital camera 100. Since the wireless setting button 880 is provided in the camera connector 206G, an operation of the wireless setting button 880 becomes impossible when the external lighting device 120G is attached to the digital camera 100. This prevents an operation mistake of the wireless setting button 880. Moreover, when a plurality of operating members that can set up the communication setting in detail are provided in the camera connector 206G instead of the wireless setting button 880, the same effect is obtained. For example, a communication channel setting button, a wireless communication ID setting button, a flash group setting button, etc. can be provided.

Next, a ninth embodiment will be described. A plurality of connection terminals are exposed to external appearance in a camera connector (shoe device). In this case, when the number of the connection terminals increases, it becomes difficult to secure mechanical strength because the width of each of the connection terminals has to be thin. As a result, damage or deformation may occur when external force is received. When a camera connector of which connection terminals are damaged or deformed is engaged with an accessory shoe, poor communication may occur due to lose connections with the signal terminals or the signal terminals of the accessory shoe may be damaged or deformed. Accordingly, this embodiment describes an external lighting device equipped with a camera connector that reduces damage and deformation of many connection terminals. In the ninth embodiment, the external lighting device is denoted by a reference numeral 120H and the camera connector is denoted by a reference numeral 206H for convenience of description.

Figure 17:
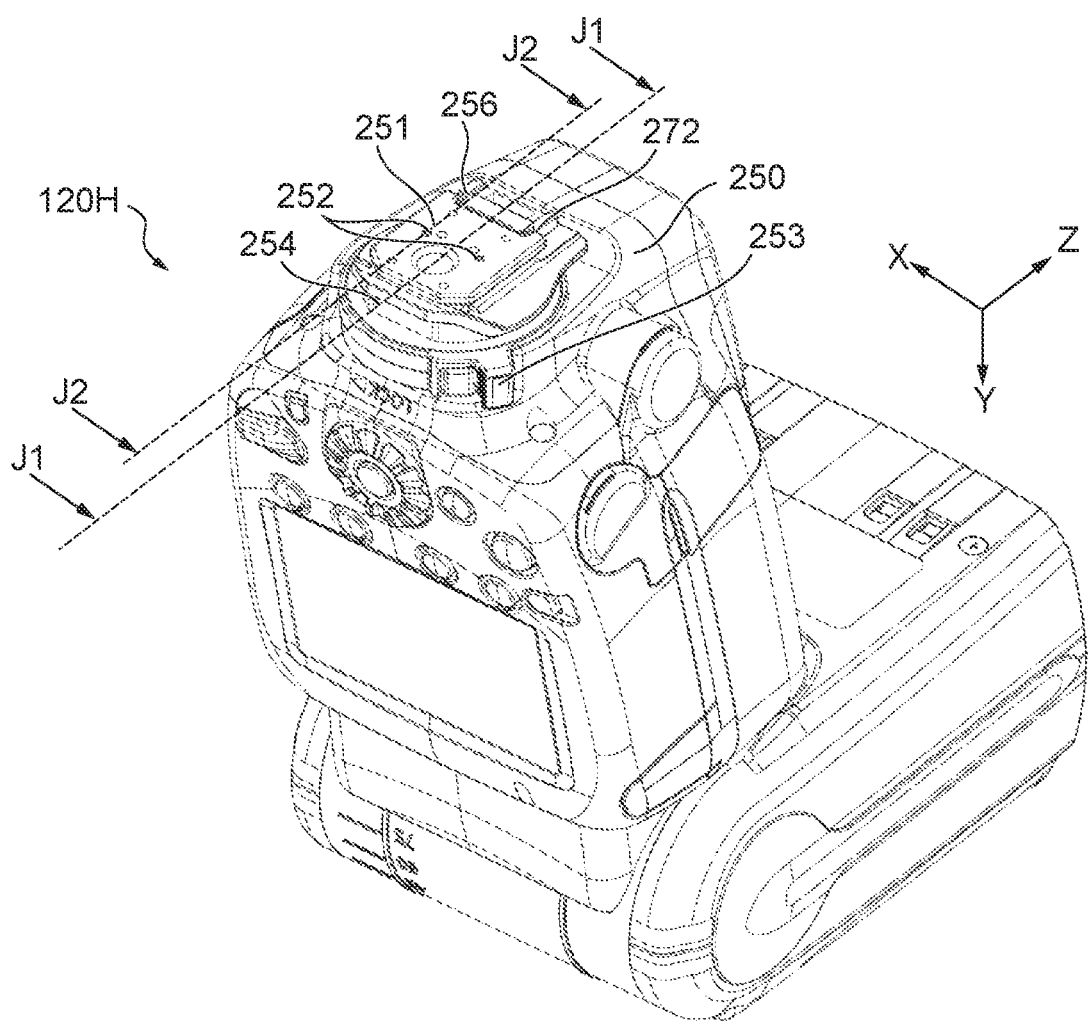
FIG. 17 is a perspective view showing an external lighting device according to a ninth embodiment.
Figure 18:
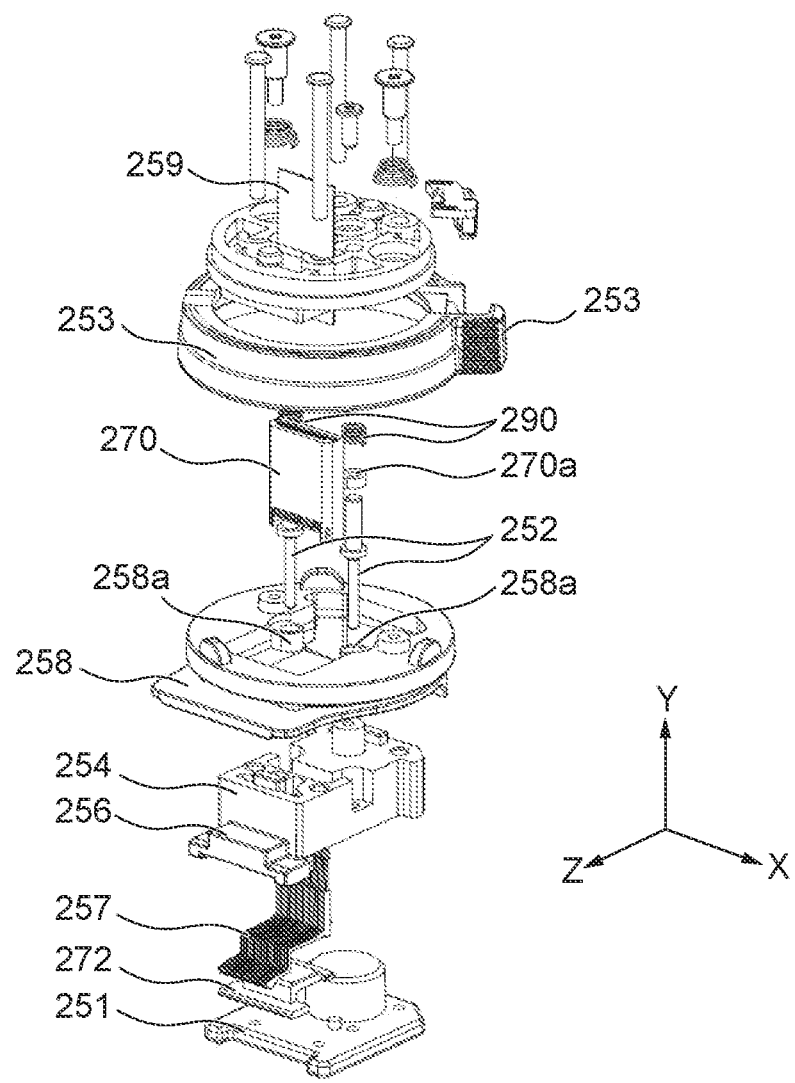
FIG. 18 is an exploded perspective view showing a camera connector of the external lighting device in FIG. 17.
Figure 19A:
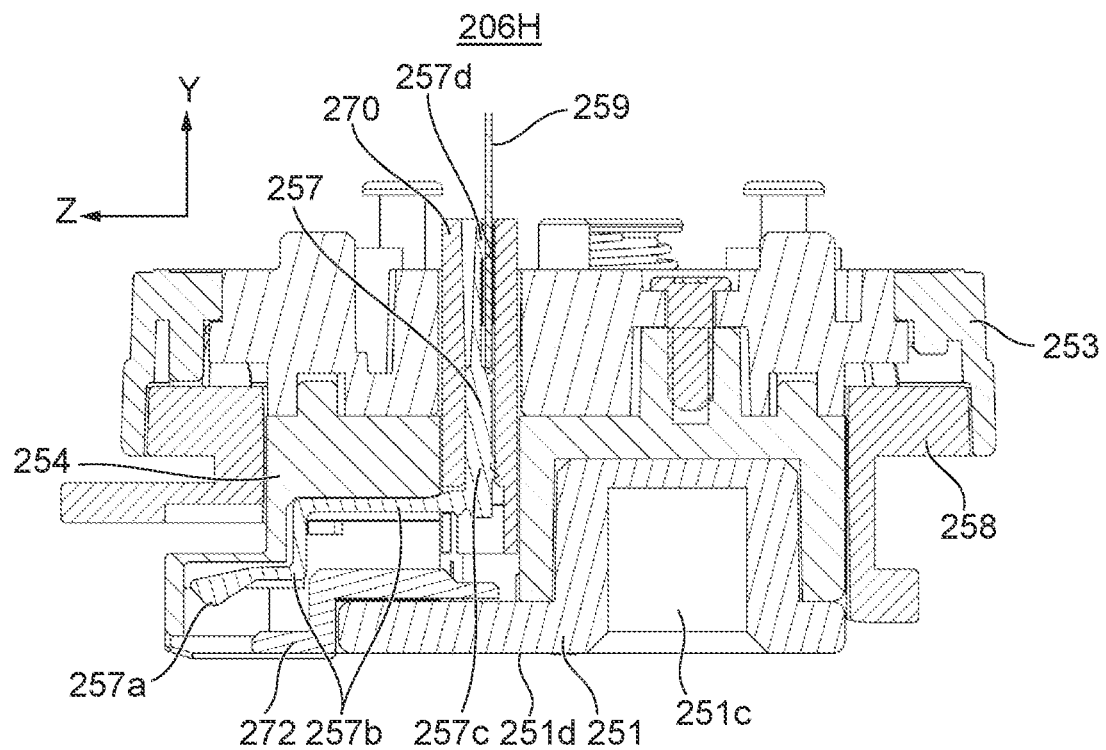
FIG. 19A and FIG. 19B are sectional views respectively showing the camera connector shown in FIG. 18 in an unlocked state taken along lines J1-J1 and J2-J2 in FIG. 17.
Figure 19B:
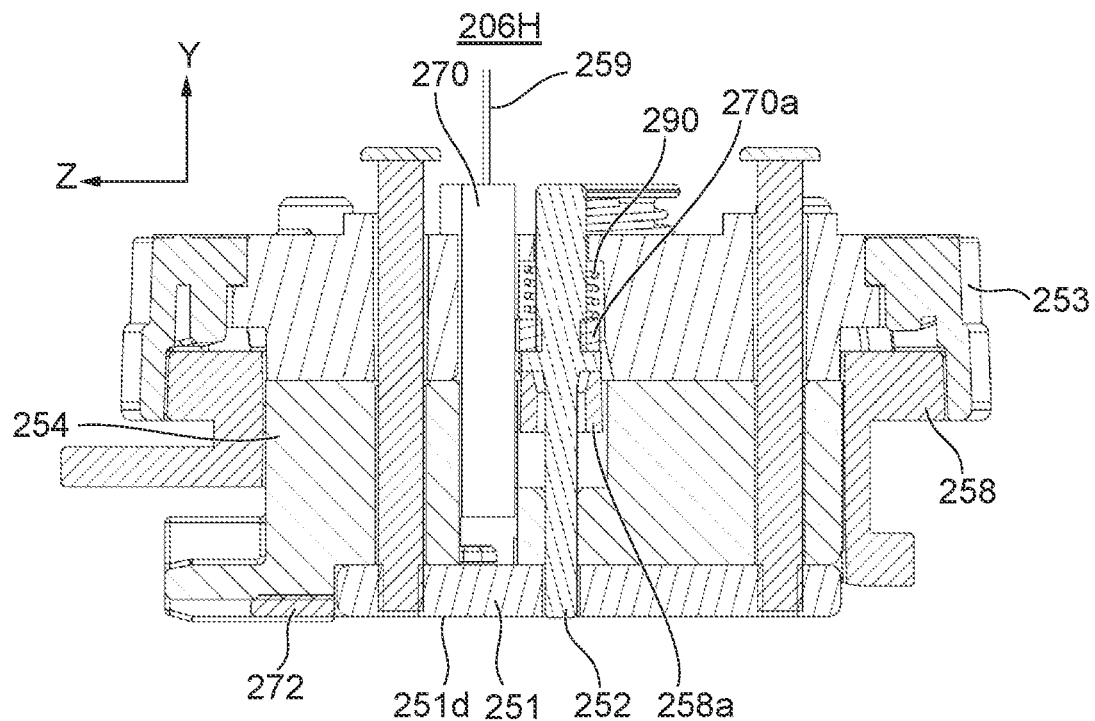
Figure 20A:
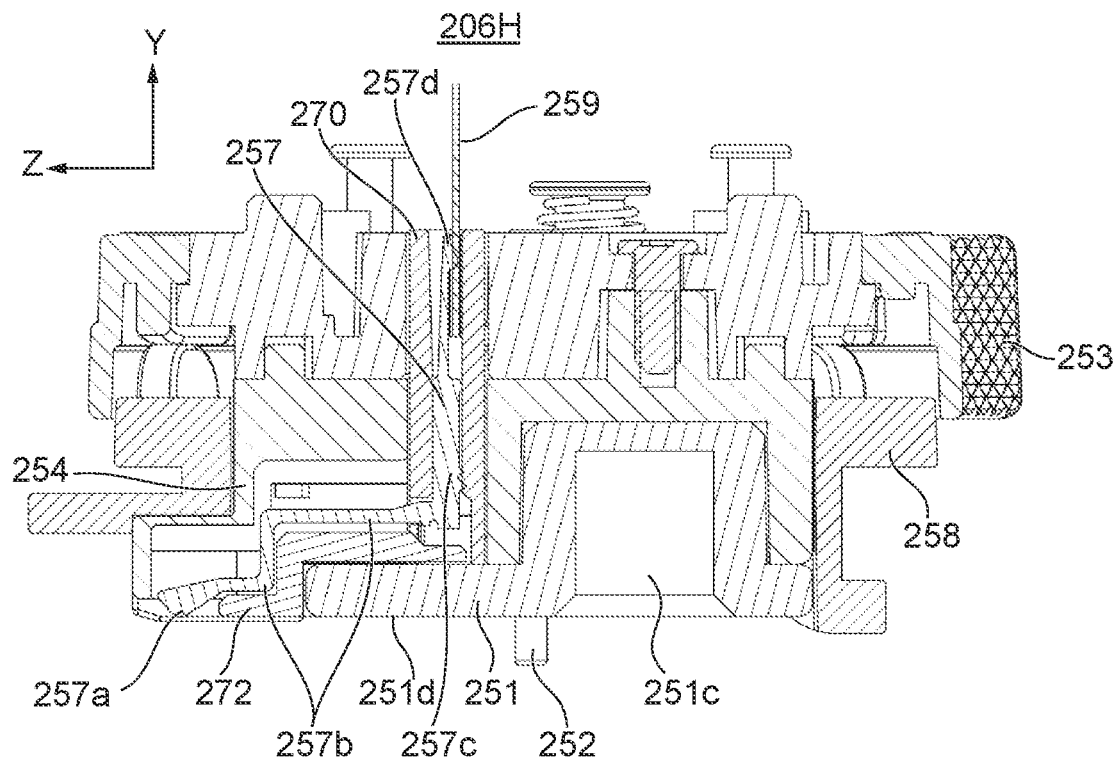
FIG. 20A and FIG. 20B are sectional views respectively showing the camera connector shown in FIG. 18 in a locked state taken along the lines J1-J1 and J2-J2 in FIG. 17.
Figure 20B:
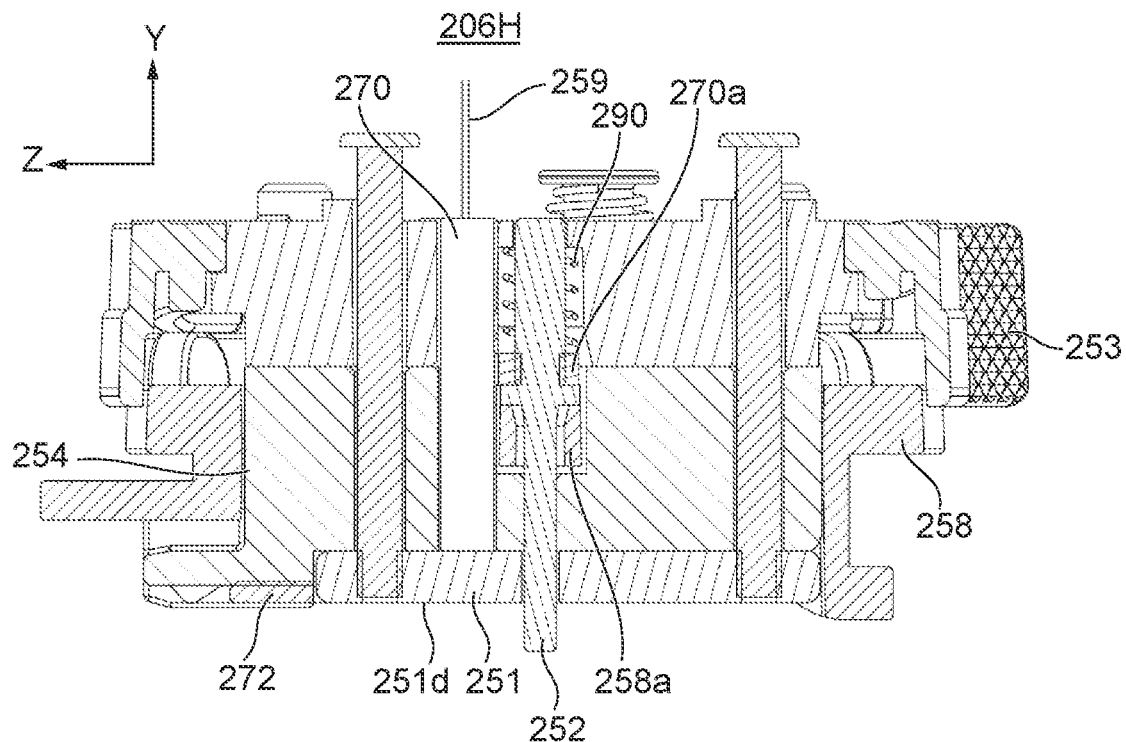

FIG. 17 is a perspective view showing the external lighting device 120H. FIG. 18 is an exploded perspective view showing the camera connector 206H of the external lighting device 120H. FIG. 19A and FIG. 19B are sectional views respectively taken along lines J1-J1 and J2-J2 in FIG. 17 and show an internal structure of the camera connector 206H in the state where the lock lever 253 is in the unlocked position. FIG. 20A and FIG. 20B are sectional views respectively taken along lines J1-J1 and J2-J2 in FIG. 17 and show an internal structure of the camera connector 206H in the state where the lock lever 253 is in the locked position.

The camera connector 206H of the external lighting device 120H is provided in the bottom of the base part 250 of the external lighting device 120H in the regular mounting state to the accessory shoe 123 of the digital camera 100. The camera connector 206H is provided with the shoe mounting leg 251, the lock pins 252, the lock lever 253, the holding member 254, the connecting plug 256, the connection terminals 257, the Y-direction holding member 258, a terminal holding member 270, and a terminal protecting plate 272.

The shoe mounting leg 251 is the engagement member of the camera connector 206H and is constituted so as to be attachable to and detachable from the engagement member 151 in order to engage the camera connector 206H with the engagement member 151 of the accessory shoe 123. Since the shoe mounting leg 251 is subjected to strong stress of external forces, such as pressure and impact, that act on the external lighting device 120G, it is formed by manufacturing a metal plate (sheet metal) and has high mechanical strength.

The two lock pins 252 prevent the external lighting device 120 from falling after the shoe mounting leg 251 is engaged with the accessory shoe 123. The lock pins 252 are provided in the shoe mounting leg 251 so as to be movable in the Y-direction. Fitting members 258a are respectively fit and fixed to the lock pins 252. The lock lever 253 and Y-direction holding member 258 move the lock pins 252. The terminal holding member 270 is held by the holding member 254 so as to be movable in the Y-direction and has slide parts 270a that are respectively engaged with the lock pins 252. The lock pins 252 and the terminal holding member 270 are energized by springs 290 in the +Y-direction.

The lock lever 253 is an operating member for a locking action that prevents the camera connector 206H from falling from the accessory shoe 123 and is rotatable to the camera connector 206H around an axis in the Y-direction. It should be noted that FIG. 17 shows the state where the lock lever 253 is in the unlocked position. When the lock lever 253 is rotationally operated from the unlocked position to the locked position in a state where the camera connector 206H is attached to the accessory shoe 123, the D-cam part (not shown) moves the Y-direction holding member 258 by a predetermined distance in the −Y-direction. At this time, since the lock pins 252 are fitting to the fitting parts 258a, the lock pins 252 move in the −Y-direction together with the Y-direction holding member 258. Thus, the lock pins 252 engage with the engagement holes 156 provided in the engaged member 151 of the accessory shoe 123. The lock pins 252 and engagement holes 156 function as a position regulation member in the Z-direction for securing an electrical connection between the external lighting device 120H and the digital camera 100. When the lock pins 252 move in the −Y-direction, the terminal holding member 270 that engages with the lock pins 252 moves in the −Y-direction by receiving the energization force by the D-cam part.

The connecting plug 256 is arranged on the +Z-direction side of the camera connector 206H and is made from non-conductive material (dielectric material), such as synthetic resin material. In the camera connector 206H, the connecting plug 256 and holding member 254 are integrally formed from resin material. The holding member 254 holds the terminal holding member 270 so as to be slidable. The terminal holding member 270 has the plurality of connection terminals 257 that contact the signal terminals 152a of the accessory shoe 123 for communication.

The connection terminals 257 correspond to the signal terminals 152a of the accessory shoe 123 one-to-one. Each of the connection terminals (hereinafter referred to as the connection terminal, simply) 257 has a front end 257a in contact with a corresponding signal terminal 152a. Moreover, the connection terminal 257 has an extension part 257b that displaces the front end 257a in the Y-direction by elastic deformation caused when the front end 257a contacts the signal terminal 152a. A vertical rising part 257c is provided at the −Z-direction end of the extension part 257b so as to intersect perpendicularly with the extension part 257b. A flexible-substrate connection part 257d is provided near the +Y-direction end of the vertical rising part 257c. The flexible-substrate connection part 257d contacts the flexible substrate 259 connected to the main substrate (not shown) of the external lighting device 120H when the flexible substrate 259 is inserted.

Next, an operation of the connection terminal 257 interlocked with the locking action of the external lighting device 120H will be described. The connection terminals 257 are fitted and engaged to the terminal holding member 270 by the vertical rising part 257c and are movable in the Y-direction together with the terminal holding member 270. As shown in FIG. 19A, in the unlocked state where the lock lever 253 is in the unlocked position, the connection terminals 257 are in storage positions inside the holding member 254 so that the front ends 257a are positioned on the +Y-direction side than the bottom surface 251d of the shoe mounting leg 251.

When the lock lever 253 is rotated from the unlocked position to the locked position, the lock pins 252 move in the −Y-direction, and the terminal holding member 270 and the connection terminals 257 move in the −Y-direction by interlocking with the movement of the lock pins 252. In this way, when the camera connector 206H comes into the locked state, the connection terminals 257 are held in connecting positions of which heights are substantially identical to the bottom surface 251d of the shoe mounting leg 251 so that the front ends 257a can connect to the signal terminals 152a as shown in FIG. 20A.

Moreover, the camera connector 206H is configured so that the connection terminals 257 will not be exposed to the bottom surface 251*d* that is the appearance surface of the shoe mounting leg 251 in the unlocked state where the lock lever 253 is in the unlocked position. That is, since the front ends 257*a* of the connection terminals 257 are stored inside the holding member 254 when the camera connector 26H is in the unlocked state, occurrence of damage and deformation of the connection terminals 257 due to a careless operation or external force can be reduced.

The shoe mounting leg 251 of the camera connector 206H may be provided with a tripod internal thread 251*c*. When a tripod (not shown) is attached to the tripod internal thread 251*c*, the bottom surface 251*d* of the shoe mounting leg 251 becomes a fixing surface to an attachment surface of the tripod. When the camera connector 206H is attached to the tripod in the state where the lock lever 253 is in the unlocked position, the front ends 257*a* of the connection terminals 257 never contact the tripod because the front ends 257*a* are positioned inside the holding member 254 as shown in FIG. 19A.

When the lock lever 253 is rotated from the unlocked position to the locked position in the state where the camera connector 206H has been attached to the tripod, the Y-direction holding member 258 moves in the −Y-direction by interlocking with the rotary action of the lock lever 253. In that time, when the front ends of the lock pins 252 abut with the attachment surface of the tripod, the lock pins 252 do not project from the bottom surface 251*d* any more. Similarly, the terminal holding member 270 and the connection terminals 257 do not move in the −Y-direction any more. Accordingly, this prevents the front ends 257*a* of the connection terminals 257 from contacting the attachment surface of the tripod.

In the meantime, the camera connector 206H can be attached to the tripod in the state where the lock lever 253 is in the locked position. In this case, the tripod external thread is screwed to the tripod internal thread 251*c* after the attachment surface of the tripod abuts with the bottom surface 251*d* of the shoe mounting leg 251 by pushing up the lock pins 252 with the attachment surface of the tripod in the +Y-direction.

The front ends 257*a* of the connection terminals 257 are retracted inside the holding member 254 in accordance with the movement of the lock pins 252 in the +Y-direction before completion of the attachment of the camera connector 206H to the tripod. That is, the front ends 257*a* of the connection terminals 257 move to the inside of the holding member 254 on the +Y-direction side than the bottom surface 251*d* before the front ends 257*a* reach the bottom surface 251*d* of the shoe mounting leg 251. This prevents the front ends 257*a* of the connection terminals 257 from contacting the attachment surface of the tripod.

In this way, since the connection terminals 257 are movable in the Y-direction by interlocking with the lock pins 252, occurrence of damage and deformation of the connection terminals 257 due to contacts of the front ends 257*a* of the connection terminals 257 to the tripod etc. can be prevented. It should be noted that the connection terminals 257 are not necessarily configured to move by interlocking with the operations of the lock pins 252. The connection terminals 257 may be configured to move by interlocking with the rotary operation of the lock lever 253 or the fastening operation of the screw mechanism.

Figure 21:
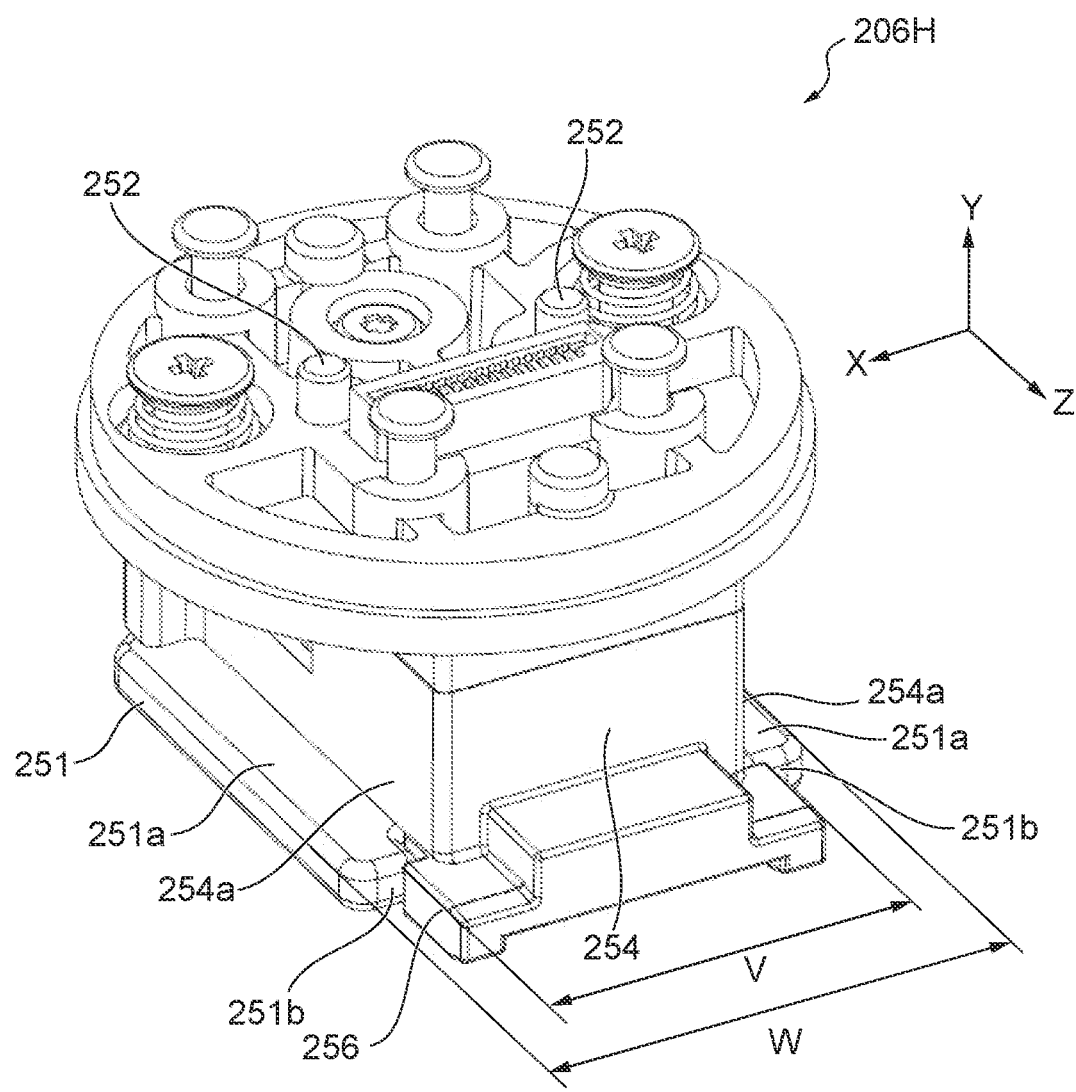
FIG. 21 is a perspective view showing an internal structure of the camera connector in FIG. 18.

FIG. 21 is a perspective view showing the internal structure of the camera connector 206H and shows a state where the base part 250, lock lever 253, and Y-direction holding member 258 have been detached from the camera connector 206H. In the camera connector 206H, the holding member 254 is fastened to the shoe mounting leg 251. Moreover, the holding member 254 has the connection part 254*a* that is insertable (engageable) into the engaged part space T of the engaged member 151 (see FIG. 5A). The width V of the connection part 254*a* is shorter than the width W of the shoe mounting leg 251.

The position in the X-direction of the external lighting device 120H with respect to the digital camera 100 is settled when the connection part 254*a* is engaged with the engaged member 151 of the accessory shoe 123. Moreover, when contacting the elastic deformation parts 154*a* of the accessory shoe spring 154 (see FIG. 4B), the shoe mounting leg 251 is energized in the +Y-direction, and the shoe fitting parts 251*a* contact the engaged member 151. This settles the position in the Y-direction of the external lighting device 120H with respect to the digital camera 100. Furthermore, when the abutting face 251*b* formed in the shoe mounting leg 251 abuts with the pair of abutting faces 154*b* provided in the accessory shoe spring 154, the position in the Z-direction of the external lighting device 120H with respect to the digital camera 100 is settled. It should be noted that the holding member 254 is also a structure for connecting the base part 250 with the shoe mounting leg 251. The lock pins 252 and connection terminals 257 are arranged inside the connection part 254*a*.

Next, a tenth embodiment will be described. In the tenth embodiment, an external lighting device is denoted by a reference numeral 120J and a camera connector is denoted by a reference numeral 206J for convenience of description. It should be noted that components of the external lighting device 120J that are identical to the components of the external lighting device 120H according to the ninth embodiment are denoted by the same reference numerals and common descriptions will be omitted.

Although the moving direction of the connection terminals 257 is identical to that of the lock pins 252 in the external lighting device 120H according to the ninth embodiment, the moving direction of the connection terminals 257 differs from the moving direction of the lock pins 252 in the external lighting device 120J. Then, the external appearances of the external lighting device 120J and camera connector 206J are approximately identical to that of the external lighting device 120H and camera connector 206H. Accordingly, an external perspective view showing the external lighting device 120J corresponding to FIG. 17 is omitted.

Figure 22:
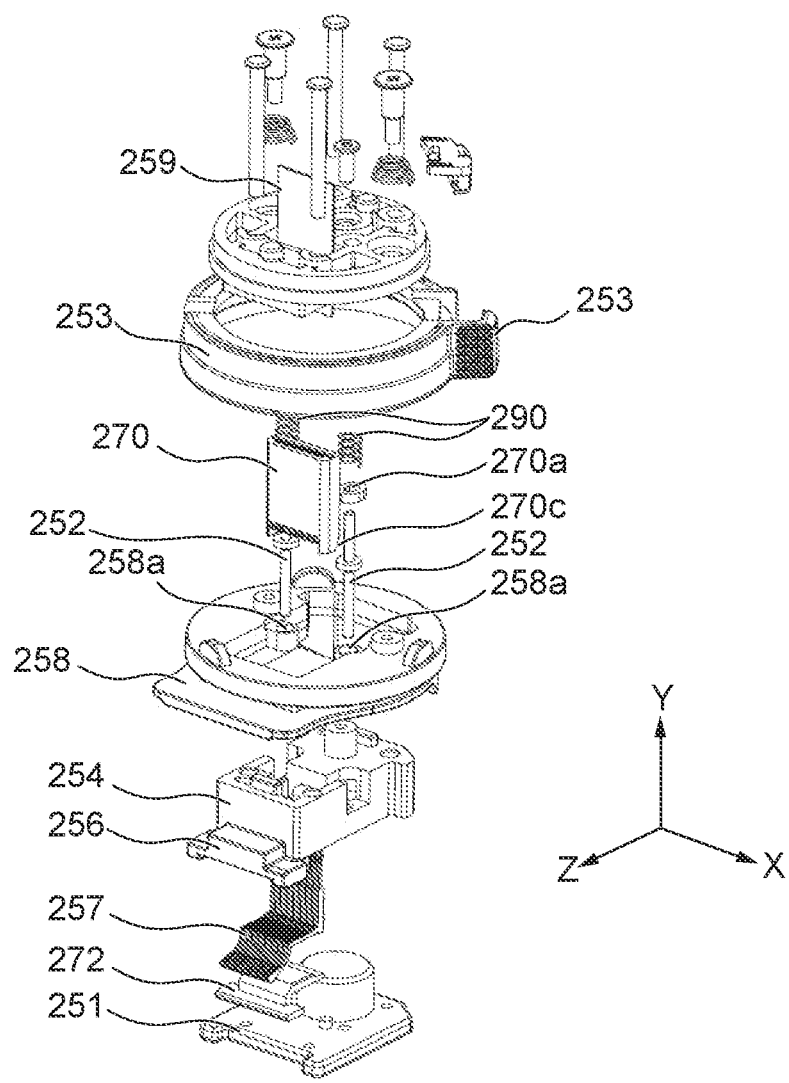
FIG. 22 is an exploded perspective view showing a camera connector of an external lighting device according to a tenth embodiment.
Figure 23A:
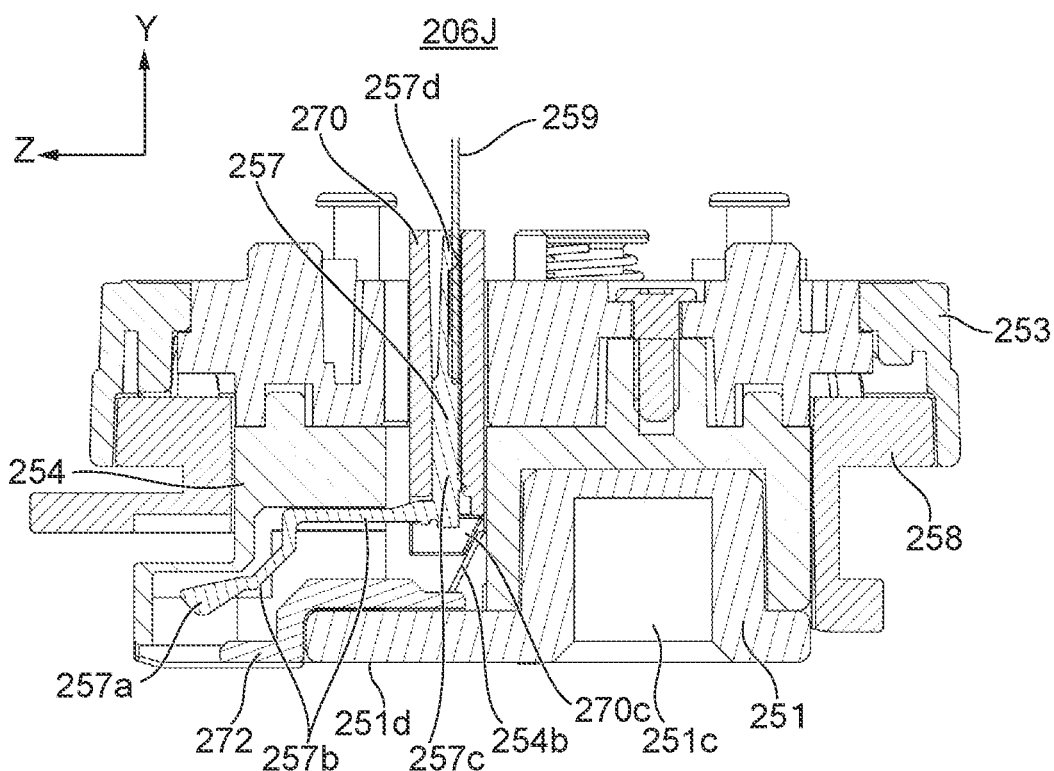
FIG. 23A and FIG. 23B are sectional views respectively showing the camera connector shown in FIG. 22 in the unlocked state taken along lines corresponding to the lines J1-J1 and J2-J2 in FIG. 17.
Figure 23B:
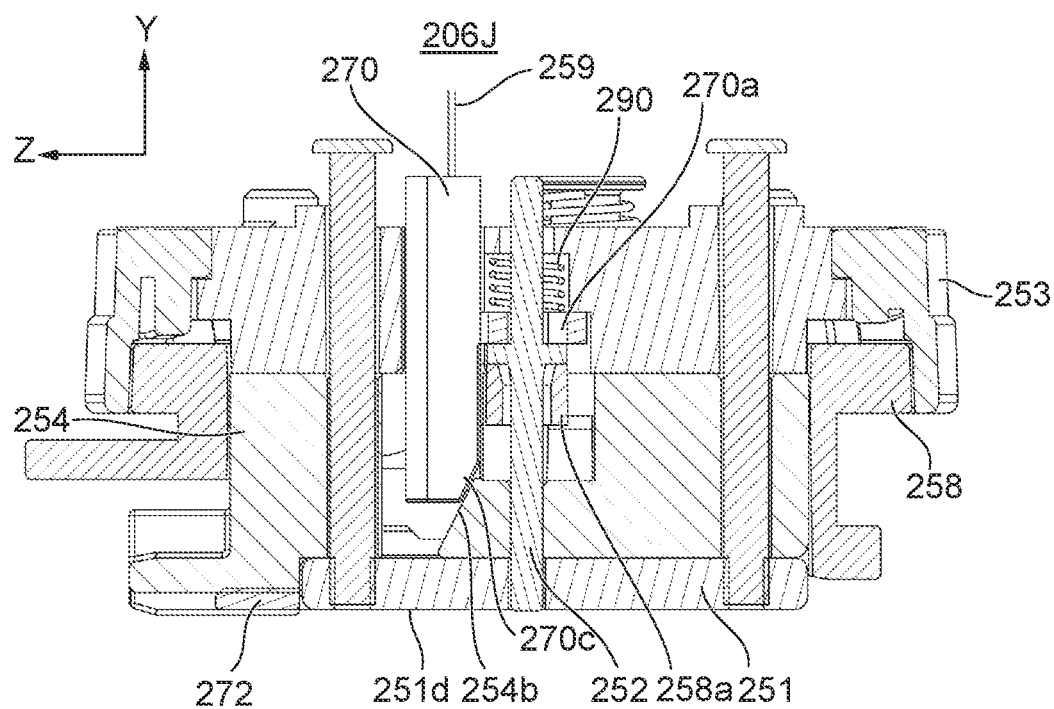

FIG. 22 is an exploded perspective view showing the camera connector 206J of the external lighting device 120J according to the tenth embodiment. FIG. 23A and FIG. 23B are sectional views respectively showing the camera connector 206J taken along lines corresponding to the lines J1-J1 and J2-J2 in FIG. 17 and show the internal structure of the camera connector 206J in the state where the lock lever 253 is in the unlocked position. FIG. 24A and FIG. 24B are sectional views respectively showing the camera connector 206J taken along the lines corresponding to the lines J1-J1 and J2-J2 in FIG. 17 and show the internal structure of the camera connector 206J in the state where the lock lever 253 is in the locked position.

The camera connector 206J is provided with the shoe mounting leg 251, the lock pins 252, the lock lever 253, the holding member 254, the connecting plug 256, and the Y-direction holding member 258. A sliding guide part 270*c* of the terminal holding member 270 shown in FIG. 23A is mounted in a position that faces a guide part 254*b* of the holding member 254. The slide parts 270*a* of the terminal holding member 270 shown in FIG. 23B are respectively engaged with the lock pins 252 so as to be capable of driving the lock pins 252 in the Z-direction. The lock pins 252 and the terminal holding member 270 are energized by the springs 290 in the +Y-direction.

The lock lever 253 is arranged rotatable around an axis in the Y-direction of the camera connector 206J between the unlocked position and locked position. As shown in FIG. 23A, in the unlocked state where the lock lever 253 is in the unlocked position, the connection terminals 257 are in storage positions inside the holding member 254 so that the front ends 257a are positioned on the +Y-direction side than the bottom surface 251d of the shoe mounting leg 251.

When the lock lever 253 is rotationally operated from the unlocked position to the locked position, the fitting part 258a of the Y-direction holding member 258 moves in the −Y-direction by the D-cam part (not shown). At this time, since the lock pins 252 are fitting to the fitting parts 258a, the lock pins 252 move in the −Y-direction together with the Y-direction holding member 258. Moreover, the terminal holding member 270 that is engaged with the lock pins 252 also moves in the −Y-direction by receiving the energization force by the D-cam part. At this time, the sliding guide part 270c of the terminal holding member 270 slides in the +Z-direction along the slant face of the guide part 254b of the holding member 254. Accordingly, the locking action of the lock lever 253 moves the connection terminals 257 and terminal holding member 270 in both the −Y-direction and the +Z-direction. In this way, in the locked state where the lock lever 253 is in the locked position, the connection terminals 257 are held in connecting positions of which heights are substantially identical to the bottom surface 251d of the shoe mounting leg 251 so that the front ends 257a can connect to the signal terminals 152a.

In this way, when the locking action of the lock lever 253 is performed after the camera connector 206J is engaged with the accessory shoe 123, the connection terminals 257 are connected to the signal terminals 152a while sliding on the surfaces of the signal terminals 152a in the +Z-direction. This enables removal of dust on the signal terminals 152a, which achieves stable communication between the external lighting device 120J and the digital camera 100. It should be noted that the connection terminals 257 are not necessarily configured to move by interlocking with the operations of the lock pins 252. The connection terminals 257 may be configured to move by interlocking with the rotary operation of the lock lever 253 or the fastening operation of the screw mechanism.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-163799, filed Sep. 29, 2020, which is hereby incorporated by reference herein in its entirety.

What is claimed is:

1. A shoe device that is attachable to and detachable from an accessory shoe device of an electronic apparatus, the shoe device comprising:
   an engagement member that is attachable to the accessory shoe device by sliding to a front side in a first direction and detachable from the accessory shoe device by sliding to a rear side in a first direction;
   a holding member that holds the engagement member;
   an attachment part that is provided in one of the engagement member and the holding member and allows attachment of a member different from the accessory shoe device; and
   a connection part that has connection terminals arranged in a second direction that intersects perpendicularly with the first direction,
   wherein the connection terminals are arranged closer to the front side than the engagement member, and
   wherein the attachment part is arranged closer to the rear side than the connection terminals.

2. The shoe device according to claim 1, wherein the engagement member is provided with the attachment part.

3. The shoe device according to claim 1, wherein the holding member is provided with the attachment part.

4. The shoe device according to claim 1, wherein the holding member holds an attachment member providing the attachment part.

5. The shoe device according to claim 1, wherein a width of the holding member is shorter than a width of the engagement member in the second direction, and
   wherein the connection terminals are arranged in an area between fastening members, which fasten the engagement member to the holding member, in the second direction.

6. The shoe device according to claim 1, further comprising lock pins that regulate the position of the shoe device to the accessory shoe device in the first direction, and wherein the attachment part is arranged in an area between the lock pins in the second direction.

7. The shoe device according to claim 1, wherein the attachment part is a tripod internal thread.

8. The shoe device according to claim 1, wherein the attachment part is made from one of metal and resin material.

9. A shoe device that is attachable to and detachable from an accessory shoe device of an electronic apparatus, the shoe device comprising:
   a lock member that is movable between an unlocked position at which the shoe device is in an unlocked state to the accessory shoe device and a locked position at which the shoe device is in a locked state to the accessory shoe device;
   connection terminals;
   a holding member that holds the connection terminals movably; and
   an interlocking mechanism that moves the connection terminals by interlocking with an action of the lock member so that front ends of the connection terminals are in storage positions inside the holding member in a case where the lock member is in the unlocked position and so that the front ends are in connecting positions where the front ends contact connection terminals of the accessory shoe device in a case where the lock member is in the locked position.

10. The shoe device according to claim 9, wherein the lock member has at least one lock pin arranged movably between a locked position and an unlocked position.

11. The shoe device according to claim 10, wherein the connection terminals moves between the storage positions and the connecting positions by interlocking with movement of the at least one lock pin between the unlocked position and the locked position.

12. The shoe device according to claim 10, further comprising an engagement member that engages with the accessory shoe device, wherein a front end of the at least one lock pin is projected from a bottom surface of the engagement member and the front ends of the connection terminals are located in positions that are substantially identical to the bottom surface of the engagement member in a case where the at least one lock pin is in the locked position, and wherein the connection terminals are moved so as not to be exposed to outside from the bottom surface of the engagement member before the front end of the at least one lock pin reaches the bottom surface of the engagement member during movement of the at least one lock pin from the locked position to the unlocked position.

13. The shoe device according to claim 10, wherein a direction of movement of the connection terminals between the storage positions and the connecting positions differs from a direction of movement of the at least one lock pin between the locked position and the unlocked position.

14. An accessory that is attachable to and detachable from an accessory shoe device of an electronic apparatus, the accessory comprising:

an engagement member that is attachable to the accessory shoe device by sliding to a front side in a first direction and detachable from the accessory shoe device by sliding to a rear side in a first direction;

a holding member that holds the engagement member;

an attachment part that is provided in one of the engagement member and the holding member and allows attachment of a member different from the accessory shoe device; and a connection part that has connection terminals arranged in a second direction that intersects perpendicularly with the first direction, wherein the connection terminals are arranged closer to the front side than the engagement member, and wherein the attachment part is arranged closer to the rear side than the connection terminals.

15. An accessory that is attachable to and detachable from an accessory shoe device of an electronic apparatus, the accessory comprising:

a lock member that is movable between an unlocked position at which the shoe device is in an unlocked state to the accessory shoe device and a locked position at which the shoe device is in a locked state to the accessory shoe device;

connection terminals;

a holding member that holds the connection terminals movably; and an interlocking mechanism that moves the connection terminals by interlocking with an action of the lock member so that front ends of the connection terminals are in storage positions inside the holding member in a case where the lock member is in the unlocked position and so that the front ends are in connecting positions where the front ends contact connection terminals of the accessory shoe device in a case where the lock member is in the locked position.

* * * * *